(12) United States Patent
Mason

(10) Patent No.: US 9,446,364 B2
(45) Date of Patent: Sep. 20, 2016

(54) SURGE DRUM MIXING SYSTEM

(75) Inventor: Gary L. Mason, El Lago, TX (US)

(73) Assignee: KELLOGG BROWN & ROOT LLC, Houston, TX (US)

( * ) Notice: Subject to any disclaimer, the term of this patent is extended or adjusted under 35 U.S.C. 154(b) by 788 days.

(21) Appl. No.: 13/403,304

(22) Filed: Feb. 23, 2012

(65) Prior Publication Data
US 2013/0225395 A1 Aug. 29, 2013

(51) Int. Cl.
| | |
|---|---|
| B01J 8/18 | (2006.01) |
| B01J 38/02 | (2006.01) |
| C10C 3/02 | (2006.01) |
| B01J 8/00 | (2006.01) |
| B01J 38/30 | (2006.01) |
| C10G 11/18 | (2006.01) |
| B01J 8/26 | (2006.01) |
| B01J 29/90 | (2006.01) |

(52) U.S. Cl.
CPC ............. *B01J 8/0055* (2013.01); *B01J 8/18* (2013.01); *B01J 8/1863* (2013.01); *B01J 8/26* (2013.01); *B01J 38/30* (2013.01); *C10G 11/182* (2013.01); *B01J 29/90* (2013.01); *B01J 2208/003* (2013.01); *B01J 2208/0053* (2013.01); *B01J 2208/00176* (2013.01); *B01J 2208/00292* (2013.01); *B01J 2208/00336* (2013.01); *Y10T 137/0335* (2015.04); *Y10T 137/85986* (2015.04); *Y10T 137/86348* (2015.04); *Y10T 137/877* (2015.04)

(58) Field of Classification Search
CPC .............. B01J 8/02; B01J 38/02; B01J 8/18; C10C 3/02; G05D 11/00; C07D 4/06
USPC ........ 422/144; 137/4, 565.11; 366/136, 137, 366/174.1, 175.2
See application file for complete search history.

(56) References Cited

U.S. PATENT DOCUMENTS

| | | | | |
|---|---|---|---|---|
| 2,410,284 | A | * 10/1946 | Gunness et al. | ......... 208/120.25 |
| 2,441,820 | A | * 5/1948 | Jewell | ............ 208/157 |
| 3,212,565 | A | * 10/1965 | Esleeck | ........... 138/30 |
| 3,253,350 | A | * 5/1966 | Kals | ................. 34/75 |
| 3,584,841 | A | * 6/1971 | Field | ............ 366/134 |
| 4,747,947 | A | * 5/1988 | Bannon | ......... 210/522 |
| 5,156,458 | A | 10/1992 | Hemrajani et al. | |
| 6,162,402 | A | 12/2000 | Lomas | |
| 7,011,740 | B2 | 3/2006 | Tallman et al. | |
| 7,153,479 | B2 | 12/2006 | Peterson et al. | |
| 7,309,445 | B2 | 12/2007 | Lange et al. | |
| 7,329,790 | B2 | 2/2008 | Bjorklund et al. | |
| 7,491,315 | B2 | 2/2009 | Eng et al. | |
| 7,611,622 | B2 | 11/2009 | Niccum et al. | |
| 7,687,677 | B1 | 3/2010 | O'Brien et al. | |
| 2003/0103852 | A1* | 6/2003 | Schob | ........ 417/410.1 |
| 2003/0227819 | A1* | 12/2003 | Villwock et al. | ........ 366/151.1 |
| 2003/0233937 | A1* | 12/2003 | Martel | ............ 95/241 |
| 2006/0104156 | A1* | 5/2006 | Villwock et al. | ........... 366/184 |

* cited by examiner

Primary Examiner — Huy-Tram Nguyen
(74) Attorney, Agent, or Firm — Gary M. Machetta

(57) ABSTRACT

Systems and methods for storing and handling slurries are provided. The surge drum system for storing a slurry can include a storage vessel having a first end, a second end, and at least one wall surrounding an internal volume between the first and second ends. The system can also include a slurry inlet and a slurry outlet, both in fluid communication with the internal volume. A recirculation inlet can be in fluid communication with the internal volume at the first end of the storage vessel. The system can also include a pump having a suction line in fluid communication with the outlet. A discharge line of the pump can be in fluid communication with an outlet valve and a recirculation valve that can be in fluid communication with the recirculation inlet.

17 Claims, 7 Drawing Sheets

SURGE DRUM MIXING SYSTEM

BACKGROUND

1. Field

Embodiments described generally relate to systems and methods for improving flow of slurry from a storage vessel that can have a variable concentration of solid particles.

2. Description of the Related Art

In fluid catalytic cracking (FCC) systems, a particulate solid catalyst and liquid hydrocarbon feedstock enter a reactor under specific reaction conditions. The effluent produced by the reaction can then be processed in a series of separators that separate most of the catalyst from the effluent. The separated catalyst can be recycled to a regenerator and then back to the reactor while the catalyst-lean effluent can be cooled and separated into the product constituents.

Residual catalyst entrained in the effluent can be collected with heavier hydrocarbons to form slurry oil. This slurry oil can be recycled to the catalyst regenerator where the hydrocarbons in the effluent can be burned to supply heat to the catalyst regeneration process. In certain FCC processes, there can be a relatively high ratio of catalyst to hydrocarbons in the slurry oil. High concentrations of catalyst in the slurry oil can be problematic if the solid catalyst particles settle out of the slurry oil and interfere with the supply of hydrocarbons to the regenerator.

There is a need, therefore, for improved systems and methods for storing and handling slurries so that solids remain suspended in the slurry oil.

DETAILED DESCRIPTION

Systems and methods for storing and handling slurries are provided. The surge drum system for storing a slurry can include a storage vessel having a first end, a second end, and at least one wall surrounding an internal volume between the first and second ends. The system can also include a slurry inlet and a slurry outlet, both in fluid communication with the internal volume. A recirculation inlet can be in fluid communication with the internal volume at the first end of the storage vessel. The system can also include a pump having a suction line in fluid communication with the outlet. A discharge line of the pump can be in fluid communication with an outlet valve and a recirculation valve that can be in fluid communication with the recirculation inlet.

Figure 1:
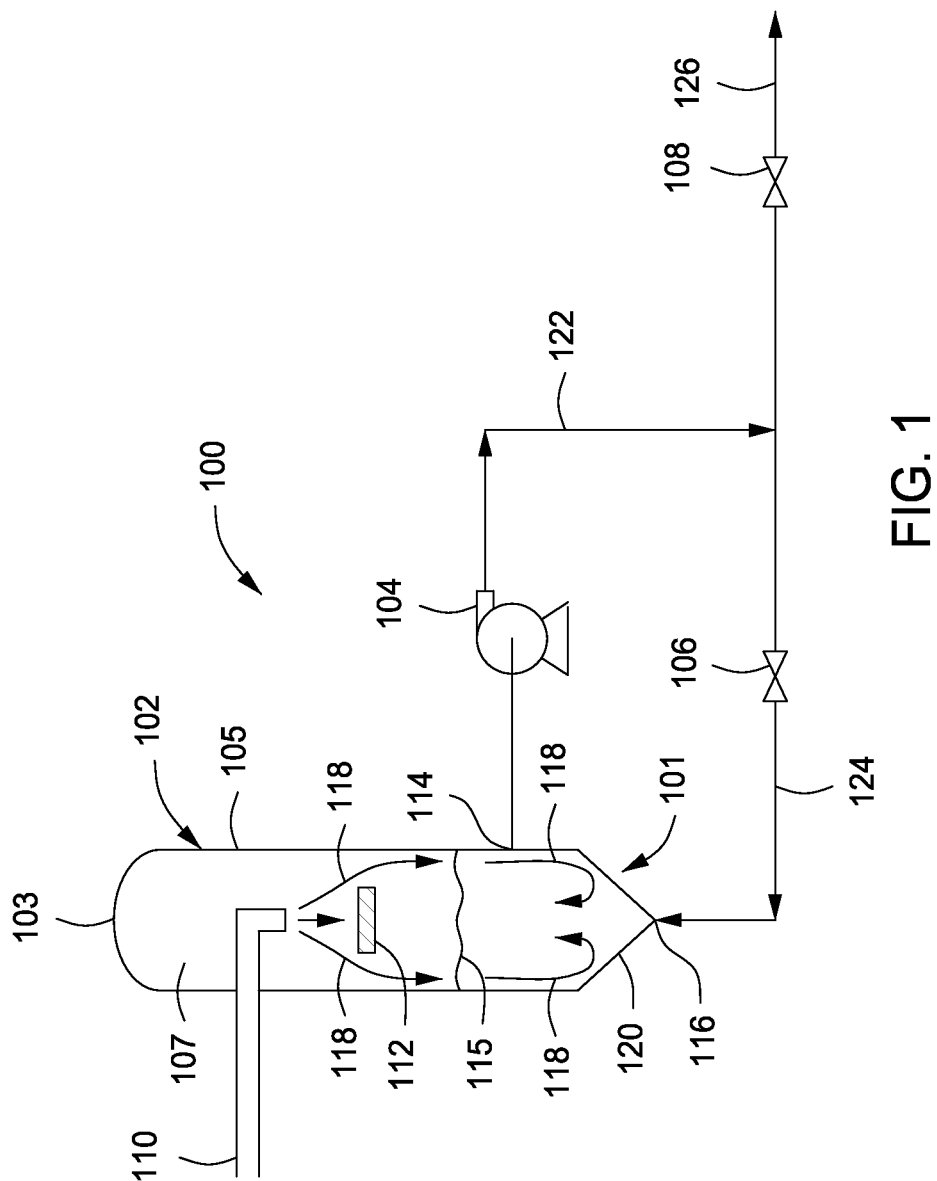
FIG. 1 depicts an illustrative surge drum system, according to one or more embodiments described.

FIG. 1 depicts an illustrative surge drum system 100 for the storage of slurry, according to one or more embodiments. The surge drum system 100 can include one or more storage vessels 102, one or more slurry pumps 104, one or more recirculation valves 106, and one or more outlet valves 108. The surge vessel 102 can include one or more slurry inlets 110, one or more flow deflectors 112, one or more outlets 114, and one or more recirculation inlets 116. In operation, slurry can be removed from the storage vessel 102 by the slurry pump 104 via an outlet 114. A portion of the slurry can be returned to the storage vessel 102 via recirculation inlet 116. As will be discussed and described in detail below (see FIGS. 7 and 8), the slurry from recirculation inlet 116 can help to reduce or prevent solid particles from settling within the storage vessel 102. Reducing or preventing the settlement of solid particles in the slurry can help to maintain the slurry in a substantially homogeneous composition within the storage vessel 102 and/or reduce or prevent plugging of the outlet 114 due to solid particles accumulating therein and/or thereabout.

The storage vessel 102 can include an inner wall or surface 105, an enclosed first or "bottom" end 101, and an open (not shown) or enclosed second or "top" end 103. The storage vessel 102 can have an inner cross-sectional shape that can be rectangular, elliptical, circular, oval, or any combination thereof. Depending, at least in part, on the configuration of inner surface 105, the inner surface 105 can form, at least in part, an internal volume 107 having, for example, a rectangular, cylindrical, spherical, ellipsoidal, spheroidal (e.g., prolate or oblate), and/or frusto-conical configuration. The slurry inlet 110 can be positioned intermediate the first end 101 and the second end 103 and in fluid communication with the internal volume 107. The outlet 114 can be positioned intermediate the slurry inlet 110 and the recirculation inlet 116. As shown, the recirculation inlet 116 can be positioned on the first end 101 and in fluid communication with the internal volume 107. In another example, the recirculation inlet 116 can be positioned closer to the first end 101 than to the second end 103.

The flow deflector 112 can be disposed within the internal volume 107 of the storage vessel 102 so as to impede direct flow between slurry inlet 110 and recirculation inlet 116. The flow deflector 112 can serve to redirect the flow of slurry from slurry inlet 110 toward the inner surface 105. This redirection can create or provide a flow path or pattern 118 that can be directed radially outward and along the inner surface 105 of the storage vessel 102 toward the first end 101, where it can be redirected back upward through the vessel along with the flow from recirculation inlet 116. The circulation of flow 118 can increase mixing within the internal volume 107, which can aid in maintaining suspension and distribution of solid particles within the slurry.

The flow deflector 112 can have any shape, design, or configuration that is suitable to alter, impede, or otherwise re-direct the flow of slurry from the slurry inlet 110 into the internal volume 107. The flow deflector 112 can also have any shape, design, or configuration that is suitable to alter, impede, or otherwise re-direct the flow of slurry toward the second end 103 between the deflector 112 and the inner surface 105. For example, the flow deflector 112 can be a substantially solid flat plate positioned so that flow from slurry inlet 110 impacts at or near the center of the flow deflector. The flow deflector 112 can have a perimeter that is spaced from the inner surface 105 so as to form an annular space that allows flow between the edges of the flow deflector 112 and the inner surface 105 of the storage vessel 102. In another example, the flow deflector 112 can be or include an angled plate, a curved plate, a perforated plate, a tray, a wire or mesh screen, a cone, an inverted cone, and the like.

The first end 101 can include a sloped or angled inner surface or "bottom" 120. The sloped bottom 120 can be configured to allow settling particles to move away from the inner surface 105 and/or to redirect flow 118 back toward the second end 103 of the storage vessel 102. The sloped bottom 120 can have a conical or frustoconical shape that tends to concentrate settled particles at or toward the center of the first end 101. The sloped bottom 120 can also be sloped so that settled particles concentrate at a location away from the center thereof. For example, the sloped bottom 120 can have an eccentric cone or offset cone configuration.

The slurry pump 104 can be in fluid communication with, and can draw slurry from, outlet 114. The outlet 114 can be a baffled outlet that can be positioned at or near an upper surface or level 115 of the slurry within the internal volume 107. A slurry discharge via line 122 from the slurry pump 104 can be in fluid communication with the recirculation valve 106 and outlet valve 108. All or a portion of the slurry discharge via line 122 can flow through recirculation valve 106, recirculation line 124, and recirculation inlet 116 back into storage vessel 102. The recirculation inlet 116 can be disposed at a lower point and/or the lowest point of sloped bottom 120 so that the flow of slurry oil through the inlet serves to move particles that have settled within storage vessel 102 back toward the second end 103 so that the particles are remixed into the slurry.

In at least one example, a first portion of the slurry discharge via line 122 can be reintroduced into storage vessel 102 and a second portion of the slurry discharge via line 122 can flow through outlet valve 108 to line 126. Recirculation valve 106 and outlet valve 108 can be operated such that from 0% to 100% of the slurry discharge via line 122 can be introduced back into storage vessel 102 to maintain suspension and favorable distribution of solid particles within the slurry in the storage vessel 102. For example, the recirculation valve 106 and outlet valve 108 can be operated such that the amount of slurry discharge via line 122 introduced back into storage vessel 102 can range from a low of about 0%, about 5%, about 10%, about 15%, or about 20% to a high of about 60%, about 70%, about 80%, or about 90%.

The slurry introduced via the slurry inlet 110 can be a liquid/particulate mixture having a solids concentration ranging from a low of about 0.1 wt %, about 0.5 wt %, about 1 wt %, about 1.5 wt %, about 1.7 wt %, or about 1.9 wt % to a high of about 4.6 wt %, about 5.1 wt %, about 5.6 wt %, about 6.2 wt %, about 7.3 wt %, about 8 wt %, about 9 wt %, or about 10 wt %. For example, the slurry can have a solids concentration ranging from about 1.5 wt % to about 5.6 wt %, about 1.6 wt % to about 5.5 wt %, about 2 wt % to about 5 wt %, about 1.8 wt % to about 4.8 wt %, about 2.3 wt % to about 4.5 wt %, or about 1.9 wt % to about 4.6 wt %.

The slurry can be formed from various mixtures of liquids and solid particles. The particulates can be a discrete mass of solid matter, porous-solid matter, semi-solid matter, or any combination thereof, that remains individually dispersed in the liquid. The particulates can be or include, but are not limited to, catalyst particles, coal particles, coal fines, hydrocarbon particles, minerals, ores, soil, dirt, rock, stone, concrete, sand, ice, fibers, e.g., plant fibers, and/or glass fibers, wood, drilling cuttings or shavings, organic oxides, e.g., silica, metal oxides, e.g., alumina, or any combination thereof. Illustrative particulate hydrocarbons can include, but are not limited to, one or more asphaltenes, one or more bitumens, one or more pitches, one or more tars, polymers or polymeric material such as homopolymers and/or copolymers of $C_2$ to $C_{40}$ olefins, and the like, or any combination thereof. Other particulates can include, but are not limited to, petroleum coke particulates, coal ash particulates, ash produced by combusting one or more combustible materials, or any combination thereof. In one or more embodiments, the slurry can be a mixture of a hydrocarbon oil and particulate catalyst, hydrocarbon oil and particulate hydrocarbons, water and/or hydrocarbon oil and particulate hydrocarbons, or water and particulates such as coal, minerals, ores, and the like. In at least one example, the slurry can include one or more liquid hydrocarbons and one or more catalyst particulates. In at least one other example, the slurry can be or include drilling mud and/or other drilling fluids. In at least one other example, the slurry can be or include an aqueous slurry or mixture of coal particles.

The particulates or particles can have an average cross-sectional length or size ranging from a low of about 0.1 μm, about 1 μm, about 3 μm or about 5 μm to a high of about 45 μm, about 50 μm, about 55 μm, about 60 μm, about 100 μm, about 150 μm, about 200 μm, about 350μ, about 500 μm, or about 1,000 μm. For example, the particulates in the slurry can have an average cross-sectional length ranging from about 1 μm to about 60 μm, about 5 μm to about 50 μm, about 10 μm to about 40 μm, about 3 μm to about 55 μm, about 20 μm to about 45 μm, or about 15 μm to about 60 μm. In another example, the particles can have an average cross-sectional length ranging from a low of about 0.1 mm, about 0.3 mm, about 0.5 mm, or about 1 mm to a high of about 3 mm, about 5 mm, about 7 mm, or about 10 mm.

The particles in the slurry can have a density ranging from a low of about 0.1 g/cm$^3$, about 0.3 g/cm$^3$, or about 0.5 g/cm$^3$ to a high of about 1 g/cm$^3$, about 2 g/cm$^3$, 3 g/cm$^3$, or about 4 g/cm$^3$. For example, the density of the particles can range from about 0.3 g/cm$^3$ to about 1.5 g/cm$^3$, about 0.7 g/cm$^3$ to about 2 g/cm$^3$, about 0.8 g/cm$^3$ to about 1 g/cm$^3$, or about 0.9 g/cm$^3$ to about 1.8 g/cm$^3$. In another example, the density of the particles in the slurry can range from about 1 g/cm$^3$ to about 6 g/cm$^3$, about 1.6 g/cm$^3$ to about 5 g/cm$^3$, about 3.3 g/cm$^3$ to about 4.5 g/cm$^3$, about 2.3 g/cm$^3$ to about 4.8 g/cm$^3$, or about 1.2 g/cm$^3$ to about 5.7 g/cm$^3$.

The liquid portion of the slurry can have a density ranging from a low of about 0.6 g/cm$^3$, about 0.7 g/cm$^3$, about 0.8 g/cm, or about 0.9 g/cm$^3$ to a high of about 1.1 g/cm$^3$, about 1.3 g/cm$^3$, about 1.5 g/cm$^3$, about 1.7 g/cm$^3$, or about 1.9 g/cm$^3$. In another example, the liquid portion of the slurry can have a density ranging from a low of about 0.9 g/cm$^3$, about 0.92 g/cm$^3$, about 0.935 g/cm$^3$ to a high of about 0.96 g/cm$^3$, about 0.98 g/cm$^3$, about 9.9 g/cm$^3$, or about 1 g/cm$^3$.

The liquid portion of the slurry can include liquids such as, aqueous rich liquids, water, process condensates, treated water, hydrocarbon liquids, or any combination thereof. Illustrative hydrocarbon liquids can include, but are not limited to, mineral oils, fuel oils, torch oil, naphtha fuels, diesel oil, bunker oil, quench oil, motor oils, deasphalted oils, heavy deasphalted oils, light deasphalted oils, light cycle oils such as fluid catalytic cracking light cycle oil, or any combination thereof. Diesel fuels, for example, can be or include hydrocarbons having from about 8 carbon atoms to about 25 carbon atoms (C8 to C25 hydrocarbons). The diesel fuel can have an average molecular weight of about 200, a specific gravity of about 0.85, a boiling point ranging from about 180° C. to about 340° C., and an auto-ignition temperature ranging from about 305° C. to about 325° C., e.g., about 315° C. Naphtha fuels can be or include hydrocarbons having about 5 to about 12 carbon atoms (C5 to C12 hydrocarbons). The naphtha fuel can have a molecular weight ranging from about 100 to about 215, a specific gravity of about 0.7, a boiling point ranging from about 30° C. to about 200° C., and an auto-ignition temperature ranging from about 540° C. to about 560° C., e.g., about 550° C. Gasoline fuels can be or include hydrocarbons having about 4 to about 12 carbon atoms (C4 to C12 hydrocarbons). The gasoline fuel can have a molecular weight ranging from about 100 to about 105, a specific gravity of about 0.72 to about 0.78, a boiling point ranging from about 26° C. to about 225° C., and an auto-ignition temperature ranging from about 245° C. to about 265° C., e.g., about 257° C.

In at least one specific embodiment, the liquid portion of the slurry can be or include a fuel oil. The fuel oil can have a density ranging from a low of about 0.85 g/cm$^3$, about 0.9 g/cm$^3$, or about 0.925 g/cm$^3$ to a high of about 0.95 g/cm$^3$, about 0.975 g/cm$^3$, or about 0.995 g/cm$^3$. The fuel oil can have a viscosity at 25° C. ranging from a low of about 0.2 cP, about 0.5 cP, about 1 cP, or about 2 cP to a high of about 5 cP, about 25 cP, or about 50 cP. For example, the fuel oil can have a viscosity at a temperature of about 25° C. ranging from about 0.25 cP to about 2.4 cP or about 0.3 cP to about 2.35 cP. The fuel oil can be or include hydrocarbons having from about 5 to about 90 carbon atoms (C5 to C90), more preferably from about 8 to about 50 carbon atoms (C8 to C50), and more preferably from about 10 to about 35 carbon atoms (C10 to C35), and more preferably from about 11 to about 20 carbon atoms (C11 to C20). Fuel oil can have an API specific gravity at 15.55° C. ranging from a low of about 10°, about 10.5°, about 11°, or about 11.4° to a high of about 15°, about 18°, about 20°, or about 21.5°. For example, the fuel oil can have an API specific gravity of about 11.4° to about 21.4°. The fuel oil can have an enthalpy ranging from a low of about 15 kCal/kg, about 25 kCal/kg, or about 40 kCal/kg to a high of about 100 kCal/kg, about 120 kCal/kg, or about 140 kCal/kg. The fuel oil can have a molecular weight ranging from a low of about 170, about 185, or about 200 to a high of about 220, about 235, or about 250. For example, the fuel oil can have a molecular weight ranging from about 186 to about 237, about 190 to about 230, or about 205 to about 230. The fuel oil can have a specific heat ranging from a low of about 0.42 kCal/kgC, about 0.45 kCal/kgC, or about 0.5 kCal/kgC to a high of about 0.53 kCal/kgC, about 0.56 kCal/kgC, or about 0.6 kCal/kgC. The fuel oil can have a thermal conductivity ranging from a low of about 0.06 kCal/hmC, about 0.065 kCal/hmc, or about 0.07 kCal/hmC to a high of about 0.085 kCal/hmC, about 0.09 kCal/hmC, or about 0.087 kCal/hmC.

The slurry can be introduced via the slurry inlet 110 at a rate ranging from a low of about 1 kg/sec, about 3 kg/sec, about 5 kg/sec, about 7.5 kg/sec, about 9 kg/sec, about 9.25 kg/sec, or about 9.4 kg/sec to a high of about 11 kg/sec, about 11.5 kg/sec, about 12 kg/sec, about 15 kg/sec, about 20 kg/sec, or about 25 kg/sec. For example, the slurry can be introduced at a rate of about 1 kg/sec to about 20 kg/sec, about 7 kg/sec to about 15 kg/sec, about 9 kg/sec to about 12 kg/sec, or about 9.412 kg/sec to about 11.515 kg/sec.

The slurry can have a viscosity ranging from a low of about 1 cP, about 3 cP, about 5 cP, about 10 cP, about 50 cP, or about 100 cP to a high of about 500 cP, about 1,000 cP, about 5,000 cP, about 10,000 cP, or about 20,000 cP at a temperature of about 25°, with suitable range comprising the combination of any lower amount and any upper amount. For example, the viscosity of the slurry can range from about 1 cP to about 3 cP, about 1 cP to about 100 cP, about 1 cP to about 15 cP, about 20 cP to about 200 cP, about 50 cP to about 700 cP, about 100 cP to about 1,000 cP, about 500 cP to about 8,000 cP, about 85 cP to about 900 cP, or about 400 cP to about 3,000 cP. The viscosity of the slurry can be determined using a Brookfield Viscometer at a temperature of about 25° C. For example, a Brookfield Viscometer, Model DV-II+, with a small sample adapter with, for example, a number 3 spindle, can be used. The small sample adapter can allow the sample to be cooled or heated by the chamber jacket to maintain the sample surrounding the spindle at a temperature of about 25° C.

The internal volume 107 of the storage vessel 102 can be configured to contain or otherwise hold any desired amount of the slurry introduced thereto via slurry inlet 110. For example, the amount of slurry that can be stored within the storage vessel 102 can range from a low of about 1 m$^3$, about 1.2 m$^3$, about 1.4 m$^3$, or about 1.6 m$^3$ to a high of about 7 m$^3$, about 8 about 9 m$^3$, about 12 m$^3$, about 15 m$^3$, about 20 m$^3$, or about 25 m$^3$. For example, the amount of slurry that can be stored within the storage vessel 102 can range from about 1.2 m$^3$ to about 9 m$^3$, about 1.3 m$^3$ to about 8.5 m$^3$, or about 1.5 m$^3$ to about 7.5 m$^3$.

The slurry discharge can be introduced via recycle line 124 via the recirculation inlet 116 to the storage vessel 102 at a rate ranging from a low of about 1 m$^3$/sec, about 3 m$^3$/sec, about 5 m$^3$/sec, about 7 m$^3$/sec, or about 10 m$^3$/sec to a high of about 11 m$^3$/sec, about 12 m$^3$/sec, about 15 m$^3$/sec, about 17 m$^3$/sec, or about 20 m$^3$/sec. For example, the rate at which the slurry can be recycled via recycle line 124 can range from about 10.1 m$^3$/sec to about 12.34 m$^3$/sec, about 10.47 m$^3$/sec to about 11.96 m$^3$/sec, or about 10.84 m$^3$/sec to about 11.59 m$^3$/sec.

The slurry discharged from surge drum system 100 via line 126 can be discharged at a rate ranging from a low of about 1 m$^3$/sec, about 2 m$^3$/sec, about 3 m$^3$/sec 3.5 m$^3$/sec, about 4 m$^3$/sec, or about 4.5 m$^3$/sec to a high of about 5.8 m$^3$/sec, about 6.5 m$^3$/sec, about 7.0 m$^3$/sec, about 10 m$^3$/sec, about 15 m$^3$/sec, or about 20 m$^3$/sec. For example, the rate at which the slurry can be discharged via line 126 can range from about 3.6 m$^3$/sec to about 7 m$^3$/sec, about 3.8 m$^3$/sec to about 6.6 m$^3$/sec, or about 4.5 m$^3$/sec to about 6 m$^3$/sec. The ratio of slurry recycled via recycle line 124 and slurry discharged via line 126 can be from about 1 to about 4, about 1.58 to about 3.08, about 1.75 to about 2.80, or about 1.93 to about 2.52.

The surge drum system 100 can be used in various industrial processes to maintain the distribution of the particles within a volume of stored slurry. According to one or more embodiments, the slurry can be a mixture of fuel oil and particulate catalyst that are used as part of a fluid catalytic cracking (FCC) process. The fuel oil can be any liquid hydrocarbon with an amount of hydrocarbons preferably equal to that required for combustion as part of the FCC process. The fuel oil can be a combination of products of the FCC process and supplemental fuel oil supplied to support the FCC process. The particulate catalyst can be a zeolite catalyst or other particulate catalyst. The liquid component can be or include, but are not limited to, hydrocarbon oils, water, or any combination thereof. Further embodiments of the surge drum system 100 will be described below with reference to various FCC systems.

Figure 2:
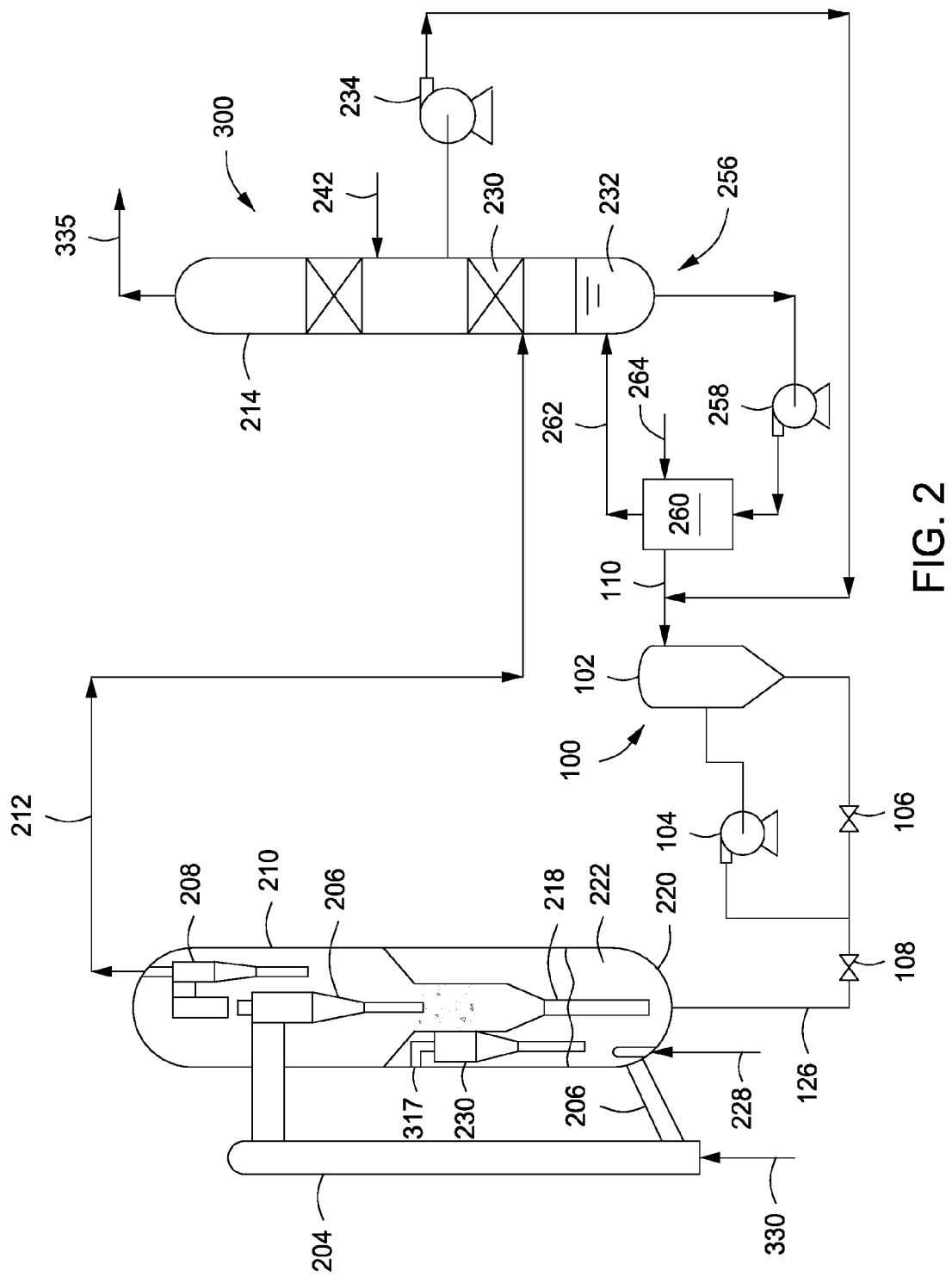
FIG. 2 depicts an illustrative fluid catalytic cracking system, according to one or more embodiments described.

FIG. 2 depicts an illustrative FCC system 300, according to one or more embodiments. In the FCC system 300 a hydrocarbon feedstock via line 330 can be introduced to riser 204 where it can be mixed with hot regenerated catalyst supplied via line 206. If desired, steam (not shown) can also be injected into the riser 204. The hydrocarbons and catalyst can flow upward in the riser 204, where the cracking reactions take place. The hydrocarbons and catalyst can be separated in a series of conventional cyclones 206, 208, and the products can be routed out of the top of the stripper vessel 210 via line 212.

The hydrocarbon feedstock in line 330 can include one or more hydrocarbon compounds containing about 80 carbon atoms or less, about 60 carbon atoms or less, about 40 carbon atoms or less, or about 20 carbon atoms or less. The hydrocarbon feedstock in line 330 can include hydrocarbon compounds containing from about 1 to about 40 carbon atoms, about 1 to about 16 carbon atoms, about 2 to about 12 carbon atoms, or about 4 to about 8 carbon atoms. The hydrocarbon feedstock in line 330 can include, but is not limited to, mixed olefins, paraffins, mixtures thereof, and/or any combination thereof.

The hydrocarbon feedstock via line 330 can originate from a refinery. The hydrocarbon feedstock in line 330 can include a liquid and/or gas mixture produced from the distillation of crude oil. The hydrocarbon feedstock in line 330 can include from about 0.1 percent by volume ("vol %") to 5 vol % methane; from about 0.1 vol % to about 10 vol % ethane; from about 0.1 vol % to about 30 vol % propane. The hydrocarbon feedstock can contain from about 0 vol % to about 35 vol % butane; and from about 0 vol % to about 20 vol % pentane and heavier hydrocarbons. The hydrocarbon feedstock can include at least 60 wt % $C_2$-$C_{11}$ olefins and paraffins.

The hydrocarbon feedstock introduced via line 330 can be pre-heated prior to introduction to the riser 204. Although not shown, in at least one specific example, a regenerative heat exchanger using waste process heat can be used to pre-heat the hydrocarbon feedstock introduced via line 330. The temperature of the hydrocarbon feedstock via line 330 can range from about 370° C. to about 790° C., about 425° C. to about 700° C., or about 500° C. to about 650° C. The pressure of the hydrocarbon feedstock via line 330 can range from about 100 kPa to about 3,450 kPa, about 100 kPa to about 2,450 kPa, or about 100 kPa to about 350 kPa.

The hydrocarbon feedstock introduced via line 330 can be partially or completely vaporized prior to introduction to the one or more risers 204. The amount of the hydrocarbon feedstock in line 330 that can be vaporized can range from a low of about 10 vol %, about 20 vol %, about 30 vol %, or about 40 vol %, to a high of about 70 vol %, about 80 vol %, about 90 vol %, or about 100 vol %. The hydrocarbon feedstock can be a minimum of 80 wt % vaporized; 85 wt % vaporized; 90 wt % vaporized; 95 wt % vaporized; or about 99 wt % vaporized prior to introduction to the riser 204. In one or more embodiments, within the riser 204, the pressure and temperature can be adjusted either manually or automatically to at least partially compensate for variations in hydrocarbon feedstock composition and to maximize the yield of preferred hydrocarbons obtained by cracking the hydrocarbon feedstock in the presence of the one or more doped catalysts.

The steam introduced into the riser 204 can be saturated. The pressure of the saturated steam can be a minimum of about 1,000 kPa, about 2,000 kPa, about 4,000 kPa, or about 6,000 kPa. The pressure of the saturated steam can range from about 100 kPa to about 8,300 kPa; about 100 kPa to about 4,000 kPa; or about 100 kPa to about 2,000 kPa.

The steam introduced into the riser 204 can be superheated. The pressure of superheated steam can be a minimum of about 1,000 kPa, about 2,000 kPa, about 4,000 kPa, or about 6,000 kPa. The pressure of the superheated steam via line 204 can range from about 100 kPa to about 8,300 kPa; about 100 kPa to about 4,000 kPa; or about 100 kPa to about 2,000 kPa. The temperature of the superheated steam can be a minimum of about 200° C., about 230° C., about 260° C., or about 290° C. The steam can be introduced to the riser 204 at a rate proportionate to the hydrocarbon feedstock rate introduced via line 330. The steam-to-hydrocarbon feedstock weight ratio can range from about 1:20 to about 50:1; from about 1:20 to about 20:1; or from about 1:10 to about 20:1. The steam-to-hydrocarbon feedstock weight ratio can remain constant or can vary.

The catalyst-to-hydrocarbon weight ratio can range from about 2:1 to about 70:1; from about 3:1 to about 30:1; about 5:1 to about 20:1, or from about 4:1 to about 8:1. The riser 204 can be operated at a temperature ranging from a low of about 425° C., about 450° C., about 475° C., or about 500° C. to a high of about 600° C., about 675° C., about 700° C., or about 825° C. The riser 204 can be operated at a temperature ranging from about 300° C. to about 675° C., from about 550° C. to about 700° C., from about 605° C. to about 670° C., from about 610° C. to about 660° C., from about 580° C. to about 700° C., from about 600° C. to about 680° C., or from about 615° C. to about 650° C. In at least one specific embodiment, the riser 204 can be operated at a temperature of about 605° C., about 615° C., about 625° C., about 630° C., about 640° C., or about 650° C.

The velocity of the reaction mixture flowing through the riser 204 can range from about 3 m/sec to about 27 m/sec, about 6 m/sec to about 25 m/sec, or about 9 m/sec to about 21 m/sec. The residence time of the reaction mixture in the riser 204 can be less than about 20 seconds, less than about 10 seconds, less than about 8 seconds, less than about 4 seconds, or less than about 2 seconds.

Catalyst separated via the cyclones 206, 208 can be collected at the bottom of the stripper vessel 210 and contacted with steam (not shown) to strip residual hydrocarbon gas from the catalyst. The steam and hydrocarbons exit the stripper vessel 210 with other effluent gases through the cyclone 208 and line 212 as previously mentioned. The catalyst can flow through standpipe 218 into the regenerator 220. In the regenerator 220, the coke that has formed on the catalyst can be at least partially burned in the dense phase bed 222 and catalyst activity can be restored for recirculation to the riser 204 via line 206.

The regenerator 220 can be supplied with fuel and air to provide the necessary heat of reaction to sustain a needed regeneration temperature. Fuel can be in the form of a fuel oil slurry that contains catalyst fines from the quench tower 214 as described in more detail below, but capability for adding fuel gas can also be provided in lieu of or to supplement the heating if desired. The fuel oil slurry can be continuously or intermittently supplied to the regenerator 220 from the surge drum system 100 via line 126. An oxidant, e.g., air can be supplied to regenerator 220 via line 228 for regeneration of the catalyst. Regeneration of the catalyst produces a flue gas that can be processed in one or more cyclones 230 to separate catalyst particles from the flue gas 317.

The products in line 212 can be routed to a quench tower 214 where entrained catalyst can be washed from the products by contact with circulating quench oil. Overhead vapor from tower 214 in line 335 can be routed to conventional product recovery facilities such as distillation towers (not shown) for recovery of ethylene, propylene and other products.

The products in line 212 can include from about 5 wt % to about 30 wt % $C_2$; about 5 wt % to about 60 wt % $C_3$; about 5 wt % to about 40 wt % $C_4$; about 5 wt % to about 50 wt % $C_5$, and heavier hydrocarbons. The temperature of the products in line 212 can range from a low of about 350° C., about 400° C., or about 450° C. to a high of about 550° C., about 300° C., or about 700° C.

The quench tower 214 can include a vapor-liquid contacting zone 230, which can include conventional packing or trays, disposed above a liquid holdup zone 232. Effluent gas from line 212 can be introduced below the contacting zone 230. A supply of quench oil can be introduced by line 242 the contacting zone 230. In the contacting zone 230, the catalyst fines in the effluent gas are washed into the quench oil, and the effluent gas can be cooled and removed from the quench tower 214 via line 335. In one or more embodiments, sidedraw pump 234 can remove a portion of the quench oil and effluent gas mixture from quench tower 214 for supply to surge drum system 100.

A filtration loop 256 can include one or more pumps 258, one or more filter systems 260, and one or more recirculation lines 262 for returning filtrate to the quench tower 214. Filter system 260 can include two or more filters arranged in parallel, or in series, so that the filtration loop can be operated with at least one filter can be in a filter mode, while at least one other filter can be in a backwash mode. The filtration can be conducted in a batchwise manner or a continuous manner. The filtration can be conducted at a rate that keeps the fines level from building to excessive levels in the recirculation line 262, preferably no more than about 0.5 weight percent fines, more preferably no more than about 0.2 weight percent, and yet more preferably no more than about 0.1 weight percent fines in the recirculation line.

A backwash medium can be provided via line 264 to pressurize and flush the collected fines from filter system 260 into inlet 110 of slurry drum system 100. The backwash fluid can be or include any medium capable of urging the collected fines into the inlet 110. For example, the backwash fluid can be, but is not limited to, one or more inert gases such as nitrogen, air, fuel gases such as a hydrocarbon gas, or any combination thereof.

As discussed above, the surge drum system 100 can include a storage vessel 102 that receives fuel oil slurry via slurry inlet 110. As shown in FIG. 2, the fuel oil slurry via slurry inlet 110 can be provided from the backwash of filter system 260. The pump 104 can draw slurry from the storage vessel 102. The recirculation valve 106 and outlet valve 108 can be operated to selectively recycle at least a portion of the slurry to storage vessel 102. Any slurry not recycled to the storage vessel 102 can be introduced via line 126 to the regenerator 220.

As an illustrative example, in a quench tower receiving 50 to 200 lbs/hr catalyst fines in the effluent gas, for example, 100 lbs/hr, then 50,000 lbs/hr of quench oil must be filtered in order to maintain a catalyst concentration of 0.2 weight percent in the recirculation line 262. The fuel oil slurry from the backwash of filter system 260 can contain a high concentration of catalyst fines, on the order of 10 to 20 weight percent. This concentration can be reduced to a manageable level, for example, 2 to 4 weight percent, by dilution with fuel oil and/or circulating quench oil prior to combustion in regenerator 220. The amount of hydrocarbons in the fuel oil slurry can be preferably equal to that required for combustion in the regenerator.

Figure 3:
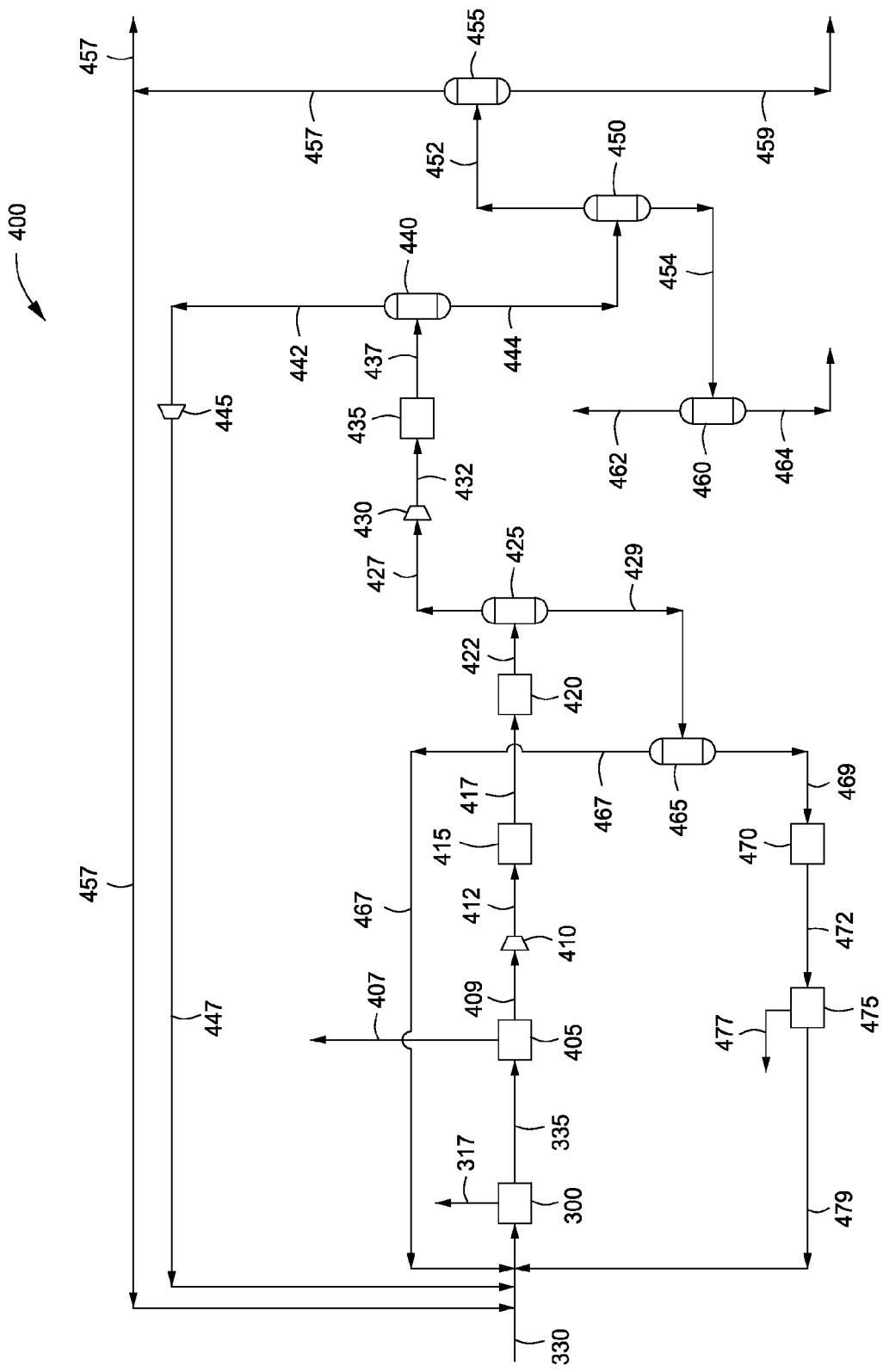
FIG. 3 depicts an illustrative system for producing one or more hydrocarbons using a fluid catalytic cracking system, according to one or more embodiments described.

FIG. 3 depicts an illustrative system 400 for producing one or more hydrocarbon products, according to one or more embodiments. In system 400, the hydrocarbon feedstock via line 330 can be cracked or separated within one or more FCC systems 300 to provide the first product via line 335, containing naphtha, propylene, ethylene, butane, mixtures thereof, and/or combinations thereof and the flue gas via line 317. The first product in line 335 can be fractionated and/or purified using one or more fractionators 405, treating units 415, drying units 420, and separators 425, 440, 450, 455, 460, and 465 to provide multiple products, including propylene, ethylene, propane, and ethane. One or more products, including methane, ethylene, and heavier $C_4$-$C_6$ hydrocarbons can be recycled to the one or more FCC systems 300.

The first product via line 335 can be separated using the one or more fractionators 405 to provide a naphthenic mixture via line 407 and an olefinic mixture via line 409. The olefinic mixture can include a major portion of one or more $C_2$-$C_{10}$ olefins and a minor portion of one or more $C_2$-$C_{10}$ paraffins. The naphthenic mixture can include $C_7$-$C_{12}$ hydrocarbons, one or more light naphthas and/or one or more heavy naphthas. For example, the naphthenic mixture can include from about 10 wt % to about 40 wt % $C_7$, from about 10 wt % to about 40 wt % $C_8$, from about 5 wt % to about 20 wt % $C_9$, and from about 5 wt % to about 20 wt % $C_{10}$-$C_{12}$ hydrocarbons.

The olefinic mixture via line 409 can include about 30 wt %, 40 wt %, or 50 wt % $C_4$-$C_{10}$ olefins. The olefinic mixture can include from about 10 wt % to about 50 wt % $C_4$, from about 10 wt % to about 50 wt % $C_5$, from about 5 wt % to about 20 wt % $C_6$, from about 5 wt % to about 20 wt % $C_7$, and heavier hydrocarbons. The pressure of the olefinic mixture exiting the fractionator 405 can range from about 100 kPa to about 1,000 kPa.

The olefinic mixture via line 409 can be compressed using one or more compressors 410 to provide a compressed olefinic mixture via line 412. Compressing the olefinic mixture can facilitate the removal of oxygenates, acid gases, water, or any combination thereof from the compressed olefinic mixture in line 412. The compressed olefinic mixture via line 412 can exit the one or more compressors 410 at a pressure ranging from about 100 kPa to about 5,000 kPa, about 100 kPa to 3,000 kPa, or about 100 kPa to 1,000 kPa. The compressed olefinic mixture can be at a temperature of from about 40° C. to about 300° C.

The compressed olefinic mixture in line 412 can be treated in the one or more treating units 415 to remove oxygenates, acid gases, water, or any combination thereof to provide a treated olefinic mixture via line 417. The treated olefinic mixture via line 417 can include less than about 500 ppmv hydrogen sulfide ("$H_2S$"), less than about 50 ppmv $H_2S$, or less than about 1 ppmv $H_2S$. The treated olefinic mixture can include less than about 500 ppmv $CO_2$; less than about 100 ppmv $CO_2$; or less than about 50 ppmv $CO_2$. The treating unit 415 can include any system or device or combination of systems and/or devices suitable for removing oxygenates, acid gases, water, derivatives thereof, and mixtures thereof, which are well known in the art of hydrocarbon refining.

The treated olefinic mixture via line 417 can be dried using one or more drying units 420, providing a dried olefinic mixture via line 422. The dried olefinic mixture in line 422 can include less than 100 ppmv water, less than 10 ppmv water, less than 1 ppmv water, or less than 0.1 ppmv water. The drying unit 420 can include any system or device or combination of systems and/or devices suitable for removing water from a hydrocarbon to provide the dried olefinic mixture via line 422. For example, the drying unit 420 can include systems that use desiccants, solvents, or any combination thereof for removing water from a hydrocarbon.

The dried olefinic mixture via line 422 can be introduced to one or more separators ("de-propanizer") 425 and separated therein to provide an overhead containing $C_3$ and lighter hydrocarbons via line 427, and a bottoms containing $C_4$ and heavier hydrocarbons via line 429. The $C_3$ and lighter hydrocarbons via line 427 can include about 90 wt %, 95 wt %, or 99 wt % $C_3$ and lighter hydrocarbons. The overhead in line 427 can include from about 10 wt % up to about 40 wt % $C_2$, from about 20 wt % up to about 70 wt % $C_3$, and from about 0.1 wt % to about 1 wt % hydrogen. The overhead in line 427 can exit the de-propanizer 425 at pressures ranging from about 500 kPa to about 2,500 kPa. The pressure of the overhead in line 427 can range from about 500 kPa to about 1,000 kPa.

The bottoms in line 429 can include $C_4$ heavier hydrocarbons. For example, the bottoms in line 429 can include about 90 wt %, 95 wt %, or 99 wt % $C_4$-$C_{10}$ hydrocarbons. The $C_4$ and heavier hydrocarbons can range from about 30 wt % to about 80 wt % $C_4$, from about 5 wt % to about 30 wt % $C_5$, from about 5 wt % to about 20 wt % $C_6$, and from about 5% to about 20 wt % $C_7$ and heavier hydrocarbons.

The one or more de-propanizers 425 can include, but are not limited to, a column containing internal components, as well as one or more condensers and/or reboilers. The one or more de-propanizers 425 can include packing media to facilitate the selective separation of $C_3$ and lighter hydrocarbons from the $C_4$ and heavier hydrocarbons. For example, each de-propanizer 425 can include one or more saddles, balls, irregular sheets, tubes, spirals, trays, and/or baffles. The operating pressure of the de-propanizer 425 can range from about 500 kPa to about 2,500 kPa, and the operating temperature of the de-propanizer 425 can range from about −60° C. to about 100° C.

The bottoms via line 429 can be introduced to one or more separators ("gasoline splitters") 465 and separated therein to provide an overhead containing $C_4$-$C_6$ hydrocarbons via line 467, and a bottoms containing $C_7$ and heavier hydrocarbons via line 469. The overhead via line 467 can include butanes and isobutanes. For example, the overhead via line 467 can include from about 50 wt % to about 95 wt % butanes. The overhead via line 467 can include from about 10 wt % to about 50 wt % isobutanes. The overhead via line 467 can include from about 10 wt % to about 50 wt % $C_4$ olefins, from about 5 wt % to about 30 wt % $C_5$ olefins, and from about 5 wt % to about 20 wt % $C_6$ olefins.

In one or more embodiments, all or any portion of the overhead in line 467 can be recycled to the FCC system 300. For example, from about 10 wt % to about 100 wt %, from about 20 wt % to about 100 wt %, from about 30 wt % to about 100 wt %, from about 40 wt % to about 100 wt %, or from about 45 wt % to about 100 wt % of the overhead in line 467 can be recycled to the FCC system 300.

The gasoline splitter 465 can include any device, system, or combination of devices and/or systems suitable for separating a hydrocarbon mixture to provide the overhead via line 467 containing the $C_4$-$C_6$ hydrocarbons, and the bottoms via line 469 containing the $C_7$ and heavier hydrocarbons. The gasoline splitter 465 can include, but is not limited to, a column containing internal components, as well as one or more condensers and/or reboilers. The gasoline splitter 465 can include packing media to facilitate the selective separation of $C_6$ and lighter hydrocarbons from $C_7$ and heavier hydrocarbons. For example, each gasoline splitter 465 can include saddles, balls, irregular sheets, tubes, spirals, trays, and/or baffles. The operating pressure of the gasoline splitter 465 can range from about 100 kPa to about 2,500 kPa, and temperature can range from about 20° C. to about 400° C.

In one or more embodiments, all or any portion of the $C_7$ and heavier hydrocarbons in line 469 can be introduced to one or more gasoline hydrotreaters 470 and stabilized therein to provide a treated gasoline via line 472. The treated gasoline via line 472 can include a minimum of about 70 wt %, 80 wt %, or 90 wt % $C_6$ and heavier hydrocarbons. The treated gasoline via line 472 can include about 75 wt % to about 85 wt % $C_6$, about 15 wt % to about 25 wt % $C_7$, or about 5 wt % to about 10 wt % $C_8$ and heavier hydrocarbons. The gasoline hydrotreater 470 can include any system or device or combination of systems and/or devices suitable for stabilizing a mixed hydrocarbon. The hydrotreater 470 can include a system that stabilizes gasoline by treating with hydrogen.

In one or more embodiments, all or any portion of the treated gasoline via line 472 can be introduced to one or more benzene, toluene, xylene ("BTX") units 475 to provide one or more aromatics including, but not limited to, benzene, toluene, xylene, or any combination thereof ("aromatics") via line 479, and a raffinate via line 477. The aromatics via line 479 can include about 40 wt %, 50 wt %, 60 wt %, 70 wt %, or 80 wt % BTX. The BTX can include from about 10 wt % to about 40 wt % benzene, from about 20 wt % to about 60 wt % toluene, and from about 10 wt % to about 40 wt % xylene. In one or more embodiments, at least a portion of the aromatics via line 479 can be combined with the hydrocarbon in line 330 and recycled to the FCC system 300. Although not shown in FIG. 3, in one or more embodiments, at least a portion of the aromatics via line 479 can be directly recycled to the FCC system 300. For example, at least about 10 wt %, 20 wt %, 30 wt %, or 40 wt % of the aromatics via line 479 can be recycled to the riser 305, either directly or via line 330. In at least one specific embodiment, about 10 wt %, 15 wt %, or 20 wt % of the aromatics via line 479 can be recycled to the riser 305 via line 330 or directly (not shown). Although not shown, the raffinate via line 477 can be further processed. For example, all or any portion of the raffinate 477 can be directed to a steam pyrolytic cracker (not shown) to recover any olefinic or paraffinic hydrocarbons contained therein.

Returning to the de-propanizer 425, the overhead via line 427 can be compressed using one or more compressors 430 to provide compressed $C_3$ and lighter hydrocarbons via line 432. Compressing the $C_3$ and lighter hydrocarbons can facilitate the subsequent separation of the lighter compounds from the $C_3$. The pressure of the compressed $C_3$ and lighter hydrocarbons can range from about 500 kPa to about 3,500 kPa, for example. The compressed $C_3$ and lighter hydrocarbons via line 432 can be cooled using one or more chill trains 435 to provide chilled $C_3$ and lighter hydrocarbons via line 437. The temperature of the chilled $C_3$ and lighter hydrocarbons in line 437 can range from about −40° C. to about 40° C. The chilled $C_3$ and lighter hydrocarbons in line 437 can have a temperature from about −20° C. to about 5° C.

The chilled $C_3$ and lighter hydrocarbons via line 437 can be separated using one or more separators ("de-methanizers") 440 to provide an overhead via line 442 containing methane, and a bottoms via line 444 containing $C_2$ and $C_3$ hydrocarbons. The overhead via line 442 can include about 50 mol % to about 95 mol % methane. The overhead via line 442 can include about 70 mol %, 80 mol %, or 90 mol % methane. The bottoms via line 444 can include from about 20 wt % to about 50 wt % $C_2$ and from about 40 wt % to about 80 wt % $C_3$ The operating pressure of the de-methanizer 440 can range from about 300 kPa to about 1,000 kPa. The $C_1$ and $C_3$ hydrocarbons via line 444 can include up to about 95 wt % $C_2$-$C_3$ or more.

In one or more embodiments, all or any portion of the overhead in line 442 can be compressed using one or more compressors 445 to provide compressed methane via line 447, which can be recycled to the FCC system 300 via line 330. Although not shown in FIG. 3, in one or more embodiments, all or any portion of the compressed methane via line 447 can be recycled directly to FCC system 300. The portion of the compressed methane via line 447 that can be recycled to the FCC system 300 can range from about 15 vol % to about 35 vol %, from about 20 vol % to 35 vol %, from about 25 vol % to 35 vol %, or from about 30 vol % to 35 vol %. The compressed methane exiting the compressor 445 can be at a temperature ranging from about 25° C. to about 200° C.

The bottoms in line 444 can be introduced to one or more separators ("de-ethanizers") 450 and separated therein to provide an overhead containing a $C_2$ hydrocarbon mixture via line 452, and a bottoms containing a $C_3$ hydrocarbon mixture via line 454. The overhead 452 can include about 90 mol %, 95 mol %, or 99 mol % $C_2$ hydrocarbon mixture. The overhead in line 452 can contain from about 5 mol % to about 70 mol % ethane and from about 30 mol % to about 95 mol % ethylene. The bottoms in line 454 can include about 90 mol %, 95 mol %, or 99 mol % $C_3$ hydrocarbons. The $C_3$ hydrocarbons in line 454 can include from about 5 mol % to about 30 mol % propane and from about 70 mol % to about 95 mol % propylene. The operating pressure of the de-ethanizer 450 can range from about 500 kPa to about 2,500 kPa, and the temperature can range from about −80° C. to about 100° C.

In one or more embodiments, at least a portion of the $C_2$ hydrocarbon mixture in the overhead in line 452 can be introduced to one or more separators ("C2 splitters") 455 and separated therein to provide an ethylene product via line 457 and an ethane product via line 459. The ethane product via line 459 can include about 90 mol %, about 95 mol %, about 99 mol %; or about 99.9 mol % ethane. The ethylene product via line 457 can include about 90 mol %, about 95 mol %, about 99 mol %, or about 99.9 mol % ethylene.

In one or more embodiments, all or any portion of the ethylene product via line 457 can be recycled to the FCC system 300. Recycling at least a portion of the ethylene product can suppress propylene production in the FCC system 300, thereby increasing the yield of ethylene in the first product via line 335. In one or more embodiments, from about 10 vol % to about 60 vol %; about 20 vol % to about 60 vol %; about 30 vol % to about 60 vol %; about 40 vol % to about 60 vol %; or about 50 vol % to about 60 vol % of the ethylene product via line 457 can be recycled to the FCC system 300. In one or more embodiments, from about 60 vol % to about 99 vol %, from about 70 vol % to about 95 vol %, or from about 80 vol % to about 90 vol % of the ethylene product can be recycled to the FCC system 300. In one or more embodiments, at least a portion of the ethylene present in line 457 can be removed as a finished product.

The C2 splitter 455 can be any device, system, or combination of devices and/or systems suitable for separating a hydrocarbon mixture to provide the ethylene product via line 457 and the ethane product via line 459. The C2 splitter 455 can include, but is not limited to, a column containing internal components, condensers and/or reboilers. The operating pressure of the C2 splitter 455 can range from about 500 kPa to about 2,500 kPa. The operating temperature of the C2 splitter 455 can range from about −80° C. to about 100° C.

The bottoms via line 454, containing $C_3$ hydrocarbons, can be introduced to one or more C3 splitters 460 and separated therein to provide a propylene product ("second product") via line 462 and a propane product via line 464. The propane product in line 464 can contain about 90 mol %, 95 mol %, 99 mol %, or 99.9 mol % propane. The propylene product via line 462 can include from about 60 wt % to about 99.9 wt % propylene.

The C3 splitter 460 can be any device, system, or combination of systems and/or devices suitable for separating the $C_3$ hydrocarbon mixture to provide the propylene product via line 462 and the propane product via line 464. The C3 splitter 460 can include, but is not limited to, a column containing internal components, as well as one or more condensers and/or reboilers. The operating pressure of the C3 splitter 460 can range from about 500 kPa to about 2,500 kPa. In one or more embodiments the operating temperature of the C3 splitter can range from about −100° C. to about 100° C.

Figure 4:
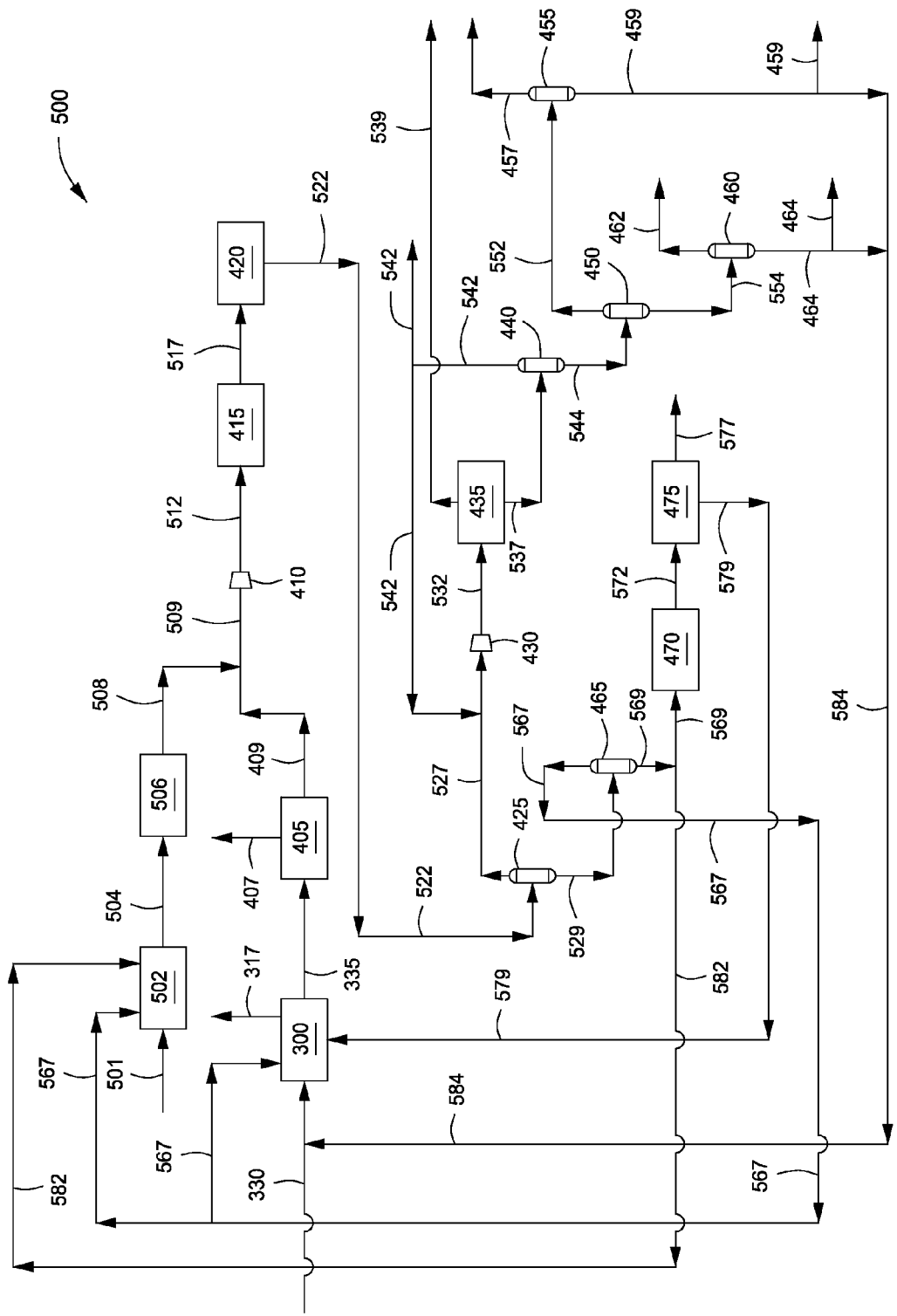
FIG. 4 depicts an illustrative system for producing one or more hydrocarbons using a fluid catalytic cracking system with another hydrocarbon cracker, according to one or more embodiments described.

FIG. 4 depicts another illustrative system 500 for producing one or more hydrocarbon products, according to one or more embodiments. As depicted, the hydrocarbon via line 330 can be introduced to the FCC system 300 and cracked therein to provide the first product via line 335 and the flue gas via line 317. The first product via 335 can be introduced to the one or more fractionators 405 to provide the olefinic mixture via line 409 and the naphthenic mixture via line 407. In one or more embodiments, one or more hydrocarbons ("refinery hydrocarbons") can be introduced via line 501 to one or more crackers 502 and cracked therein to provide product via line 504 containing ethylene, propylene, ethane, propane and/or butane. The product in line 504 can be introduced to one or more quench columns 506 to provide a quenched product via line 508. The quenched product in line 508 can be combined with the olefinic mixture in line 409 to provide a combined hydrocarbon mixture via line 509.

In one or more embodiments, each cracker 502 can be a fluid catalytic riser type reactor containing one or more risers or cracking zones suitable for cracking and/or separating a refinery hydrocarbon. As used herein, the term "refinery hydrocarbon" refers to gas oils, full range gas oils, resids, derivatives thereof, and/or mixtures thereof. In one or more embodiments, at least two fluid catalytic crackers 502 can operate in parallel or series. The temperature of the riser or cracking zone of the fluid catalytic cracker 502 can range from about 400° C. to about 300° C.

The hydrocarbon mixture via line 509 can be compressed using the one or more compressors 410 to provide a compressed mixture via line 512, which can be treated using the one or more treating units 415 to provide a treated mixture via line 517. The treated mixture can be dried using the one or more drying units 420 to provide a dried mixture via line 522. The dried mixture via line 522 can be introduced to the one or more de-propanizers 425 and separated therein to provide an overhead 527 containing $C_3$ and lighter hydrocarbons and a bottoms 529 containing $C_4$ and heavier hydrocarbons.

The $C_4$ and heavier hydrocarbons via line 529 can be introduced to the one or more gasoline splitters 465 and separated therein to provide an overhead 567 containing $C_4$-$C_6$ hydrocarbons and a bottoms 569 containing $C_7$ and heavier hydrocarbons. In one or more embodiments, at least a portion of the $C_4$-$C_6$ hydrocarbons in line 567 can be recycled to the FCC system 300 and/or hydrocarbon feedstock in line 330 (not shown). In one or more embodiments, about 5 wt %, about 15 wt %, about 25 wt %, about 35 wt %, about 45 wt %, about 55 wt %, or about 65 wt % of the $C_4$-$C_6$ hydrocarbons via line 567 can be recycled to the FCC system 300 and/or hydrocarbon feedstock in line 330.

In one or more embodiments, at least a portion of the $C_4$-$C_6$ hydrocarbons via line 567 can be recycled to the cracker 502 and/or refinery feed 501 (not shown). For example, from about 55 wt % to about 95 wt %, about 55 wt % to about 65 wt %, about 65 wt % to about 75 wt %, about 75 wt % to about 85 wt %, or about 85 wt % to about 95 wt % of the $C_4$-$C_6$ hydrocarbons via line 567 can be recycled to the cracker 502 and/or refinery feed 501 (not shown). In one or more embodiments, from about 10 wt % to about 20 wt %, about 20 wt % to about 30 wt %, about 30 wt % to about 40 wt %, or about 40 wt % to about 50 wt % of the $C_4$-$C_6$ hydrocarbons via line 567 can be recycled to the cracker 502 and/or refinery feed 501 (not shown).

In one or more embodiments, at least a portion of the $C_4$-$C_6$ hydrocarbons via line 567 can be recycled to the FCC system 300 (not shown) and at least a portion to the cracker 502. In one or more embodiments, about 10 wt % to about 60 wt %, about 10 wt % to about 35 wt %, about 25 wt % to about 45 wt %, or about 35 wt % to about 60 wt % of the $C_4$-$C_6$ hydrocarbons via line 567 can be recycled to the FCC system 300 with the balance recycled to the cracker 502. In one or more embodiments, from about 25 wt % to about 99 wt %, from about 25 wt % to about 55 wt %, from about 45 wt % to about 65 wt %, from about 55 wt % to about 85 wt %, or from about 65 wt % to 100 wt % of the $C_4$-$C_6$ hydrocarbons via line 567 can be recycled to the FCC system 300 with the balance to the cracker 502. Recycling at least a portion of the $C_4$-$C_6$ hydrocarbons to the FCC system 300 can increase the production of aromatic BTX. Recycling at least a portion of the $C_4$-$C_6$ hydrocarbons via line 567 to the cracker 502 can increase the production of propylene by increasing the concentration of $C_4$ and higher compounds in the cracker 502.

The gasoline splitter bottoms via line 569, containing $C_7$ and heavier hydrocarbons, can be stabilized using one or more gasoline hydrotreaters 470 to provide a treated gasoline via line 572. In one or more embodiments, at least a portion of the $C_7$ and heavier hydrocarbons in line 569 can be recycled to the cracker 502 via recycle line 582. In one or more embodiments, about 10 wt % to about 20 wt %, about 15 wt % to about 35 wt %, about 30 wt % to 55 wt %, about 50 wt % to about 75 wt %, or about 65 wt % to about 80 wt % of the $C_7$ and heavier hydrocarbons via line 569 can be recycled to the cracker 502 via recycle line 582. Recycling at least a portion of the $C_7$ and heavier hydrocarbons to the cracker 582 can increase the production of ethylene.

The treated gasoline via line 572 can be introduced to one or more BTX units 475 and separated therein to provide aromatics, including, but not limited to, benzene, toluene, xylene, mixtures thereof, or combinations thereof via line 577, and a raffinate via line 579. The aromatics content of the raffinate in line 579 can be less than about 10 wt %, 5 wt %, or 1 wt %. In one or more embodiments, all or any portion of the raffinate via line 579 can be recycled to the FCC system 300. For example, at least 20 wt %, 30 wt %, 40 wt %, or 50 wt % of the raffinate in line 579 can be recycled to the FCC system 300. In one or more embodiments, at least 70 wt %, 80 wt %, or 90 wt % of the raffinate in line 579 can be recycled to the FCC system 300.

Returning to the de-propanizer 425, The overhead, containing $C_3$ and lighter hydrocarbons in line 527 can be compressed using the one or more compressors 430 to provide compressed $C_3$ and lighter hydrocarbons via line 532. The compressed $C_3$ and lighter hydrocarbons via line 532 can be chilled using the one or more chill trains 435 to provide an overhead containing hydrogen via line 539 and a bottoms containing $C_3$ and lighter hydrocarbons via line 537. In one or more embodiments, chilling the compressed $C_3$ and lighter hydrocarbons can further facilitate the separation of hydrogen and other non-condensable components via line 539 from the $C_3$ and lighter hydrocarbons via line 537.

The $C_3$ and lighter hydrocarbons via line 537 can be separated using the one or more de-methanizers 440 to provide an overhead containing methane via line 542 and a bottoms containing $C_2$ and $C_3$ hydrocarbons via line 544. In one or more embodiments, all or any portion of the methane via line 542 can be recycled to the one or more compressors 430. Recycling at least a portion of the methane via line 542 can auto-refrigerate the compressed $C_3$ and lighter hydrocarbons via line 527 thereby improving the recovery of olefins, and increasing the propylene yield in the converted propylene production process.

The $C_2$ and $C_3$ hydrocarbons via line 544 can be separated using the one or more de-ethanizers 450 to provide an overhead containing a $C_2$ hydrocarbon mixture via line 552 and a bottoms containing a $C_3$ hydrocarbon mixture via line 554. In one or more embodiments, one or more C2 splitters 455 can be used to separate the $C_2$ hydrocarbon mixture via line 552 to provide an ethylene product via line 457 and an ethane product via line 459. One or more C3 splitters 460 can be used to separate the $C_3$ hydrocarbon mixture via line 554 to provide a propylene product via line 462 and a propane product via line 464.

In one or more embodiments, all or any portion of the ethane product via line 459 and propane product via line 464 can be recycled to the FCC system 300 via recycle line 584. For example, from about 60 vol % to about 100 vol %, from about 70 vol % to about 100 vol %, about 80 vol % to about 100 vol %, or about 90 vol % to about 100 vol % of the ethane product via line 459 and from about 70 vol % to about 100 vol %, about 80 vol % to about 100 vol %, or about 90 vol % to about 100 vol % of the propane product via line 464 can be recycled to the FCC system 300 via line 584. In one or more embodiments, from about 15 vol % to about 55 vol %, about 25 vol % to about 55 vol %, about 35 vol % to about 55 vol %, or about 45 vol % to about 55 vol % of the propane product via line 464 can be recycled to the FCC system 300. In at least one specific embodiment, from about 15 vol % to about 45 vol %, about 25 vol % to about 45 vol %, or about 35 vol % to about 45 vol % of the ethane product via line 584 can be recycled to the FCC system 300.

Figure 5:
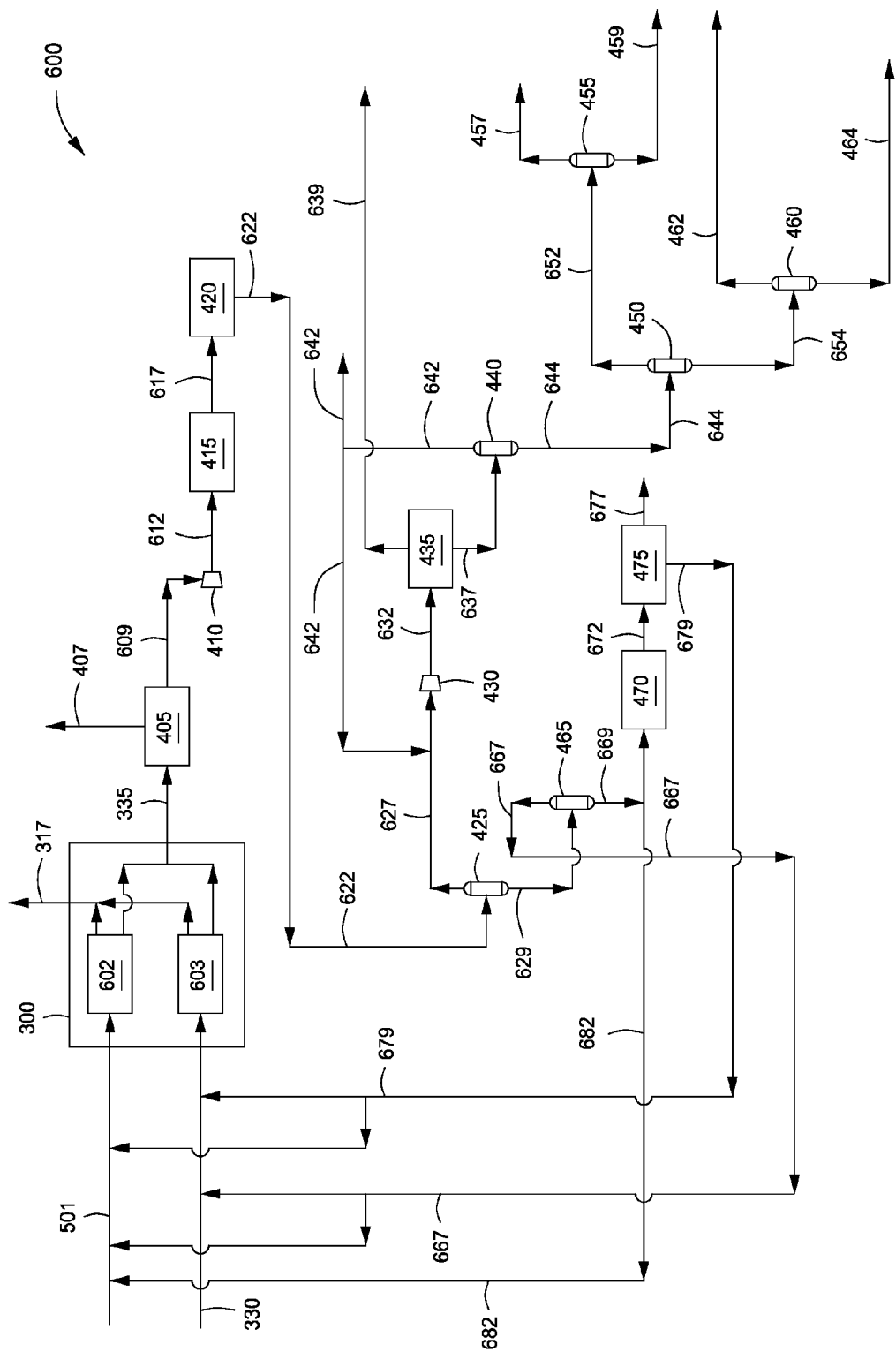
FIG. 5 depicts an illustrative system for producing one or more hydrocarbons using a fluid catalytic cracking system having multiple risers, according to one or more embodiments described.

FIG. 5 depicts another illustrative system 600 for producing one or more hydrocarbon products, according to one or more embodiments. In one or more embodiments, each FCC system 300 can include two or more risers or zones 602, 603 each independently operated at conditions sufficient to crack or otherwise separate different feeds or cuts into one or more olefins. The refinery hydrocarbon via line 501 can be introduced to the riser or first zone 602 and the feedstock via line 330 can be introduced to the second riser or cracking zone 603. The effluents from each riser or cracking zone 602, 603 can be combined, forming the first product ("hydrocarbon mixture") via line 335. The hydrocarbon mixture can be fractionated and purified using the one or more fractionators 405, treating units 415, 420 and separators 425, 440, 450, 455, 460 and 465, all as described above with reference to FIGS. 3 and 4, to provide multiple products via line 335 including propylene, ethylene, propane and ethane.

As discussed and described above in reference to FIG. 2 a regenerator waste gas or flue gas from the FCC system 300 can be recovered via line 317. The two or more risers (two are shown 602, 603) can each include one or more independent regenerators (not shown) or the two or more risers can share a single or multiple regenerators (not shown) to provide the flue gas via line 317. The one or more independent regenerators and/or the shared single or multiple regenerators can be similar to, or the same as, the regenerator 315 discussed and described above with reference to FIG. 2.

The first product via line 335 can be introduced to the one or more fractionators 405 and separated therein to provide a naphthenic mixture via line 407 and an olefinic mixture via line 609. The naphthenic mixture can include, but is not limited to, light naphthas, heavy naphthas, naphthenic compounds, derivatives thereof, mixtures thereof, or combinations thereof. The olefinic mixture via line 609 can be compressed using the one or more compressors 410 to provide a compressed olefinic mixture via line 612, which can be treated using the one or more treating units 415 to provide a treated olefinic mixture via line 617. The treated olefinic mixture can be introduced to the one or more drying units 420 to provide dried olefinic mixture via line 622.

The dried olefinic mixture via line 622 can be introduced to the one or more de-propanizers 425 and separated therein to provide an overhead containing $C_3$ and lighter hydrocarbons via line 627, and a bottoms containing $C_4$ and heavier hydrocarbons via line 629. The $C_4$ and heavier hydrocarbons via line 629 can be introduced to the one or more gasoline splitters 465 and separated therein to provide an overhead containing $C_4$-$C_6$ hydrocarbons via line 667 and a bottoms containing $C_7$ and heavier hydrocarbons via line 669.

In one or more embodiments, at least a portion of the $C_4$-$C_6$ hydrocarbons via line 667 can be recycled to the first riser or cracking zone 602 and/or the second riser or cracking zone 603. For example, about 10 wt % to about 60 wt %, about 10 wt % to about 35 wt %, about 25 wt % to about 45 wt %, or about 35 wt % to about 60 wt % of the $C_4$-$C_6$ hydrocarbons via line 667 can be recycled to the first riser or cracking zone 602 with the balance recycled to the second riser or cracking zone 603. In one or more embodiments, from about 25 wt % to about 100 wt %, 25 wt % to about 55 wt %, about 45 wt % to about 65 wt %, about 55 wt % to about 85 wt %, or about 65 wt % to 99 wt % of the $C_4$-$C_6$ hydrocarbons via line 667 can be recycled to the first riser or cracking zone 602 with the balance to the second riser or cracking zone 603. Recycling at least a portion of the $C_4$-$C_6$ hydrocarbons via line 667 to the first riser or cracking zone 602 can increase the production of the aromatics (i.e. BTX). Recycling at least a portion of the $C_4$-$C_6$ hydrocarbons via line 667 to the second riser or cracking zone 603 can increase the production of propylene.

In one or more embodiments, at least a portion of the $C_7$ and heavier hydrocarbons via line 669 can be recycled via line 682 to the first riser or cracking zone 602. In one or more embodiments, from about 10 wt % to about 20 wt %, about 15 wt % to about 35 wt %, about 30 wt % to about 55 wt %, 50 wt % to about 75 wt %, or about 65 wt % to about 80 wt % of the $C_7$ and heavier hydrocarbons in line 669 can be recycled to the first riser or cracking zone 602 via recycle line 682. Recycling at least a portion of the $C_7$ and heavier hydrocarbons via line 682 can increase the production of ethylene by increasing the concentration of heavy hydrocarbons in the first riser or cracking zone 602.

The $C_7$ and heavier hydrocarbons via line 669 can be stabilized using the one or more gasoline hydrotreaters 470 to provide a treated gasoline via line 672. The treated gasoline via line 672 can be separated using the one or more BTX units 475 to separate the aromatics via line 677 from a raffinate via line 679.

In one or more embodiments, at least a portion of the raffinate via line 679 can be recycled to the second riser or cracking zone 603. The raffinate via line 679 can be lean in aromatics, for example, the raffinate via line 679 can include less than about 10 wt %, 5 wt %, or 1 wt % BTX. In one or more embodiments, at least 70 wt %, 80 wt %, or 90 wt % of the raffinate via line 679 can be recycled to the second riser or cracking zone 603 with the balance to the first riser or cracking zone 602. In one or more embodiments, at least 20 wt %, 30 wt %, 40 wt %, or 50 wt % of the raffinate via line 679 can be recycled to the first riser or cracking zone 602. In one or more embodiments, at least 20 wt %, 30 wt %, 40 wt %, or 50 wt % of the raffinate via line 679 can be recycled to the second riser or cracking zone 603 with the balance to the first riser or cracking zone 602. In one or more embodiments, at least 70 wt %, 80 wt %, or 90 wt % of the raffinate via line 679 can be recycled to the second riser or cracking zone 603 with the balance to the first riser or cracking zone 602.

Although not shown in FIG. 5, in one or more embodiments, all or any portion of the aromatics via line 677 can be recycled to the first riser or cracking zone 602. For example, at least 20 wt %, 40 wt %, 60 wt %, 80 wt %, or 90 wt % of the aromatics via line 677 can be recycled to the first riser or cracking zone 602.

Returning to the de-propanizer 425, The $C_3$ and lighter hydrocarbons via line 627 can be compressed using the one or more compressors 430 to provide compressed $C_3$ and lighter hydrocarbons via line 632. The compressed $C_3$ and lighter hydrocarbons via line 632 can be chilled and separated using one or more chill trains 435 to provide an overhead containing hydrogen and non-condensable gases, mixtures thereof and combinations thereof via line 639, and a bottoms containing $C_3$ and lighter hydrocarbons via line 637.

The $C_3$ and lighter hydrocarbons via line 637 can be introduced to the one or more de-methanizers 440 and separated therein to provide an overhead containing methane via line 642 and a bottoms containing $C_2$ and $C_3$ hydrocarbons via line 644. In one or more embodiments, all or any portion of the methane via line 642 can be recycled to the inlet of the one or more compressors 430. Recycling at least portion of the methane via line 642 auto-refrigerates the compressed $C_3$ and lighter hydrocarbons in line 627 thereby improving the recovery of olefins and increasing the propylene yield in the converted propylene production process.

The $C_2$ and $C_3$ hydrocarbons via line 644 can be introduced to the one or more de-ethanizers 450 and separated therein to provide an overhead containing a $C_2$ hydrocarbon mixture via line 652 and a bottoms containing a $C_3$ hydrocarbon mixture via line 654. The $C_2$ hydrocarbon mixture via line 652 can be introduced to the one or more C2 splitters 455 and separated therein to provide an ethylene product via line 457 and an ethane product via line 459. The one or more C3 splitters 460 can be used to separate the $C_3$ hydrocarbon mixture via line 654 to provide the propylene product via line 462 and the propane product via line 464.

Figure 6:
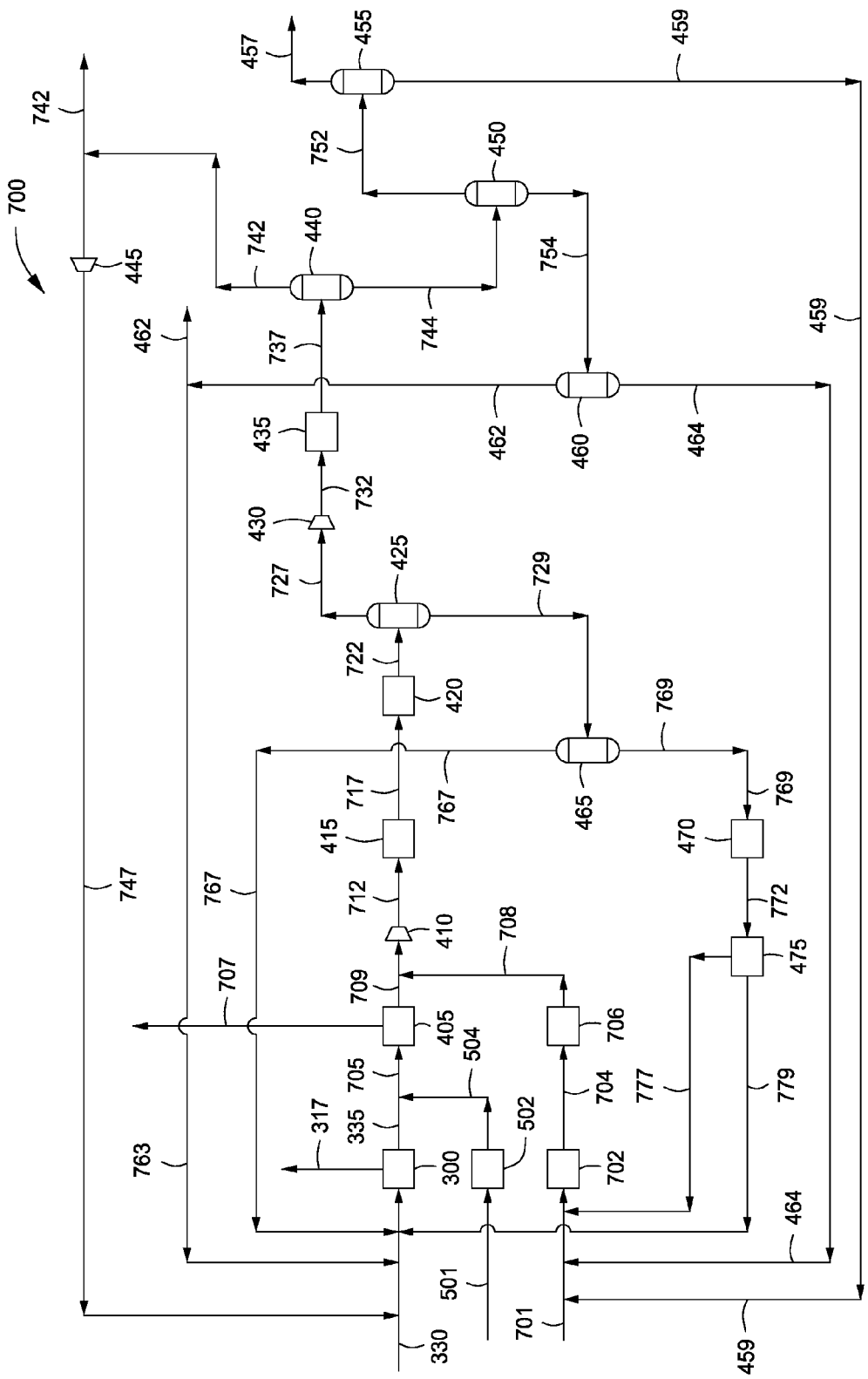
FIG. 6 depicts an illustrative system for producing one or more hydrocarbons using a fluid catalytic cracking system and a steam pyrolytic cracker, according to one or more embodiments described.

FIG. 6 depicts yet another illustrative system 700 for producing one or more hydrocarbon products, according to one or more embodiments. The hydrocarbon via line 330 can be introduced to the FCC system 300 and cracked therein to provide the first product via line 335. In one or more embodiments, one or more refinery hydrocarbons and/or light hydrocarbons via line 501 can be introduced to the cracker 502 and cracked therein to provide a cracked hydrocarbon via line 504. In one or more embodiments, one or more alkanes can be introduced via line 701 to one or more steam pyrolytic crackers 702 to provide an effluent ("cracked alkanes") via line 704. The cracked alkanes via line 704 can be cooled using one or more quench columns 706 to provide a cooled effluent via line 708. As discussed and described above in reference to FIGS. 2-5 a regenerator waste gas or flue gas provided from the FCC system 300 can be recovered via line 317.

Although not shown in FIG. 6, in one or more embodiments, one or more mixed hydrocarbon feedstocks can be introduced to one or more pre-fractionators. Within the one or more pre-fractionators, the mixed hydrocarbon feedstock can be fractionated or otherwise separated to provide at least a portion of the feedstock in line 330, at least a portion of the one or more refinery hydrocarbons and/or light hydrocarbons via line 501, and/or at least a portion of the one or more alkanes via line 701.

The first product via line 335 and the cracked hydrocarbon via line 504 can be combined to provide a second hydrocarbon mixture via line 705. The second hydrocarbon mixture in line 705 can be fractionated using the one or more fractionators 405 to provide an olefinic mixture via line 709 and a naphthenic mixture via line 707. The olefinic mixture via line 709 can be combined with the quenched effluent via line 708 and purified using the one or more treating units 415, 420 and separators 425, 440, 450, 455, 460 and 465 to provide multiple products including propylene, ethylene, propane and ethane. Heavier $C_4$-$C_6$ hydrocarbons, separated from the finished products, can be recycled to the FCC system 300, cracker 502, and/or steam pyrolytic cracker 702 as depicted in FIG. 6.

The one or more fractionators 405 can remove heavy naphtha, light cycle oil, slurry oil, or any combination thereof from the second hydrocarbon mixture to recover the olefinic mixture via line 709 and the naphthenic mixture via line 707. The olefinic mixture can include one or more $C_2$-$C_{10}$ olefins. The naphthenic mixture via line 707 can include about 40 wt % to about 90 wt % $C_7$-$C_{12}$ hydrocarbons. The naphtha via line 707 can include from about 5 wt % to about 40 wt % $C_7$, from about 5 wt % to about 40 wt % $C_8$, from about 5 wt % to about 20 wt % $C_9$, or from about 5 wt % to about 10 wt % $C_{10}$ and heavier hydrocarbons. The olefinic mixture via line 709 can include 20 wt % to 90 wt % of the one or more $C_2$-$C_{10}$ hydrocarbons. The olefinic mixture can include from about 5 wt % to about 30 wt % $C_4$, from about 5 wt % to about 30 wt % $C_5$, from about 5 wt % to about 30 wt % $C_6$, and from about 5 wt % to about 20 wt % $C_7$ and heavier hydrocarbons. The olefinic mixture can exit the fractionator 405 at a pressure of about 100 kPa up to about 500 kPa.

The refinery and/or light hydrocarbons via line 501 can be introduced to the cracker 502 at a temperature ranging from about 25° C. to about 300° C. The refinery and/or light hydrocarbons can be preheated to temperatures ranging from about 25° C. to about 200° C. prior to cracking.

The alkanes introduced via line 701 to the steam pyrolytic cracker 702 can include one or more paraffinic hydrocarbons having two or more carbon atoms. The alkanes can include one or more $C_2$-$C_{12}$ paraffinic hydrocarbons. The one or more alkanes can be introduced to the cracker 702 at a temperature of about 25° C. to about 200° C. The one or more alkanes can be introduced to the steam pyrolytic cracker 702 at a pressure of about 100 kPa to about 2,000 kPa.

The cracked hydrocarbons via line 504 can include 50 wt %, 60 wt %, or 70 wt % $C_4$-$C_{10}$. The cracked hydrocarbons in line 504 can include from about 1 wt % to about 10 wt % $C_2$, from about 1 wt % to about 20 wt % $C_3$, from about 5 wt % to about 25 wt % $C_4$, from about 5 wt % to about 25 wt % $C_5$, and from about 30 wt % to about 70 wt % $C_6$ and heavier hydrocarbons. The cracked hydrocarbons can exit the fluidized catalytic cracker 502 at a temperature of about 300° C. to about 400° C.

The alkane feed via line 701 can include methane, ethane, propane, butane, mixtures thereof and/or combinations thereof. The alkane feed via line 701 can include from about 70 wt %, about 80 wt %, or about 90 wt % alkanes. The alkane feed via line 701 can be introduced to a convection zone (not shown) of the steam pyrolytic cracker 702 at a temperature of about 100° C. to about 300° C. The alkane feed can be heated in the convection zone of the steam pyrolytic cracker 702 to a temperature of about 400° C. to about 700° C. The alkane feed can be partially vaporized in the convection zone. For example, about 10 wt %, 20 wt %, 30 wt %, 40 wt %, or 50 wt % of the alkane feed can be vaporized in the convection zone of the steam pyrolytic cracker 702. In one or more embodiments, a minimum of 55 wt %, 65 wt %, 75 wt %, 85 wt %, 95 wt %, or 100 wt % of the alkane feed via line 701 can be vaporized in the convection zone of the steam pyrolytic cracker 702. The quenched effluent in line 708 can include about 20 wt % to about 60 wt % ethane and about 5 wt % to about 30 wt % propane.

The quench column 706 can be any device, system, or combination of systems and/or devices suitable for reducing the temperature of the cracked hydrocarbon mixture in line 704. Reducing the temperature of the cracked hydrocarbon can reduce or stop the rate of hydrocarbon cracking. The quench column 706 can include packing media to provide surface area for the cracked alkanes and a heat transfer medium to make thermal contact. For example, the packing media can include rings, saddles, balls, irregular sheets, tubes, spirals, trays, baffles, or any combination thereof. The cooled hydrocarbons can exit the quench column 706 via line 708 at a temperature from about 25° C. to about 100° C.

The cooled hydrocarbons via line 708 can be combined with the olefinic mixture via line 709 and compressed using one or more compressors 410. A compressed olefinic mixture via line 712 can exit the one or more compressors 410 at a pressure of from about 500 kPa to about 4,000 kPa. The pressure of the compressed olefinic mixture via line 712 can range from about 500 kPa to 3,000 kPa; or about 500 kPa to 1,000 kPa. The compressed olefinic mixture in line 712 can be at a temperature of from about 40° C. to about 300° C.

The compressed olefinic mixture via line 712 can be treated using one or more treating units 415 to remove oxygenates, acid gases, water, or any combination thereof to provide a treated olefinic mixture via line 717. The treated olefinic mixture via line 717 can include less than about 500 ppmv $H_2S$, less than about 50 ppmv $H_2S$, or less than about 1 ppmv $H_2S$. The treated olefinic mixture in line 717 can include less than about 500 ppmv $CO_2$, less than about 100 ppmv $CO_2$, or less than about 50 ppmv $CO_2$.

The treated olefinic mixture via line 717 can be dried in the one or more drying units 420 to provide dried olefinic mixture via line 722. The dried olefinic mixture can include less than 100 ppmv water; less than 10 ppmv water; or less than 0.1 ppmv water. The dried olefinic mixture can include less than 5 ppmv water; less than 1 ppmv water; or less than 0.5 ppmv water.

The dried olefinic mixture in line 722 can be introduced to one or more de-propanizers 425 and separated therein to provide an overhead containing $C_3$ and lighter hydrocarbons via line 727, and a bottoms containing $C_4$ and heavier hydrocarbons via line 729. The $C_3$ and lighter hydrocarbons via line 727 can include 90 wt %, 95 wt %, or 99 wt % $C_3$ and lighter hydrocarbons. The $C_3$ and lighter hydrocarbons can include hydrogen. The $C_3$ and lighter hydrocarbons can include from about 10 wt % to about 40 wt % $C_2$, from about 20 wt % to about 70 wt % $C_3$, and from about 0.1 wt % to about 1 wt % $H_2$. The $C_3$ and lighter hydrocarbons via line 727 can exit the de-propanizer 425 at a pressure of from about 500 kPa to about 2,500 kPa. The pressure of the $C_3$ and lighter hydrocarbons in line 727 can be from about 500 kPa to about 1,000 kPa. The $C_4$ and heavier hydrocarbons via line 729 can include 90 wt %, 95 wt %, or 99 wt % $C_4$-$C_{10}$ hydrocarbons. The $C_4$ and heavier hydrocarbons via line 729 can include from about 30 wt % to about 80 wt % $C_4$, from about 5 wt % to about 30 wt % $C_5$, from about 5 wt % to about 20 wt % $C_6$, and from about 5 wt % to about 20 wt % $C_7$ and heavier hydrocarbons.

The $C_4$ and heavier hydrocarbons via line 729 can be introduced to the one or more gasoline splitters 465 and separated therein to provide an overhead containing $C_4$-$C_6$ hydrocarbons via line 767, and bottoms containing $C_7$ and heavier hydrocarbons via line 769. The $C_7$ and heavier hydrocarbons can include about 80 wt %, 90 wt %, or 95 wt % $C_4$-$C_6$, and from about 5 wt % to about 80 wt % $C_7$ and heavier hydrocarbons. The $C_7$ and heavier hydrocarbons can include from about 40 wt % to about 80 wt % $C_4$, from about 5 wt % to about 60 wt % $C_5$, from about 1 wt % to about 30 wt % $C_6$, from about 1 wt % to about 20 wt % $C_7$, and from about 1% to about 10 wt % $C_8$ and heavier hydrocarbons.

In one or more embodiments, at least a portion of the $C_4$-$C_6$ hydrocarbons via line 767 can be recycled directly to the FCC system 300 (not shown). For example, about 55 wt % to about 65 wt %, about 65 wt % to about 75 wt %, about 75 wt % to about 85 wt %, or about 85 wt % to about 95 wt % of $C_4$-$C_6$ hydrocarbons via line 767 can be recycled to the FCC system 300. In one or more embodiments, about 10 wt % to about 20 wt %, about 20 wt % to about 30 wt %, about 30 wt % to about 40 wt %, or about 40 wt % to about 50 wt % of the $C_4$-$C_6$ hydrocarbons via line 767 can be recycled to the FCC system 300. In one or more embodiments, at least a portion of the $C_4$-$C_6$ hydrocarbons via line 767 can be combined with the hydrocarbon in line 330. In one or more embodiments, about 10 wt % to about 20 wt %, about 20 wt % to about 30 wt %, about 30 wt % to about 40 wt %, or about 40 wt % to about 50 wt % of $C_4$-$C_6$ hydrocarbons via line 767 can be combined with the hydrocarbon in line 330. In one or more embodiments, about 5 wt % to about 35 wt %, about 15 wt % to about 55 wt %, about 45 wt % to about 70 wt %, about 60 wt % to about 85 wt %, or about 75 wt % to about 100 wt % of the $C_4$-$C_6$ hydrocarbons via line 767 can be combined with hydrocarbon in line 330.

The $C_4$-$C_6$ hydrocarbons via line 767 can include butanes and isobutanes. The $C_4$-$C_6$ hydrocarbons can include from about 10 wt % to about 50 wt % butanes. The $C_4$-$C_6$ hydrocarbons can include from about 10 wt % to about 50 wt % isobutanes. The $C_4$-$C_6$ hydrocarbons via line 767 can include $C_4$-$C_6$ olefins from about 50 wt % to about 90 wt % $C_4$-$C_6$ olefins. The $C_4$-$C_6$ hydrocarbons via line 767 can include from about 10 wt % to about 50 wt % $C_4$ olefins, from about 10 wt % to about 50 wt % $C_5$ olefins, and from about 5 wt % to about 30 wt % $C_6$ olefins.

The $C_7$ and heavier hydrocarbons via line 769 can be stabilized using the one or more gasoline hydrotreaters 470 to provide a treated gasoline via line 772. The treated gasoline can include from about 70 wt %, 80 wt %, or 90 wt % $C_6$ and heavier hydrocarbons. The treated gasoline can include from about 75 wt % to about 85 wt % $C_6$, from about 15 wt % to about 25 wt % $C_7$, and from about 5 wt % to about 10 wt % $C_8$ and heavier hydrocarbons.

The treated gasoline in line 772 can be separated using the one or more BTX units 475 to separate the aromatics via line 779, and a raffinate via line 777. The aromatics concentration in line 779 can include about 40 wt %, about 50 wt %, about 60 wt %, about 70 wt %, or about 80 wt % BTX. The aromatics can include from about 10 wt % to about 40 wt % benzene, from about 20 wt % to about 60 wt % toluene, and from about 10 wt % to about 40 wt % xylene. In one or more embodiments, at least a portion of the aromatics via line 779 can be directly recycled to the FCC system 300 (not shown in FIG. 6), or recycled to the FCC system 300 via line 330. In one or more embodiments, about 10 wt %, about 20 wt %, about 30 wt %, or about 40 wt % of the aromatics can be recycled to the FCC system 300. In at least one specific embodiment, about 10 wt %, about 15 wt %, or about 20 wt % of the aromatics via line 779 can be recycled to FCC system 300.

The raffinate via line 777 can be lean in aromatics, for example, the raffinate can include less than about 40 wt %, 30 wt %, 20 wt %, or 10 wt % BTX. In one or more embodiments, at least a portion of the raffinate in line 777 can be directly recycled (not shown) or recycled to the steam pyrolytic cracker 702 via the alkane feed in line 701. In one or more embodiments, about 20 wt %, about 30 wt %, about 40 wt %, or about 50 wt % of the raffinate can be recycled to the steam pyrolytic cracker 702. In one or more embodiments, about 70 wt %, about 80 wt %, or about 90 wt % of the raffinate in line 777 can be recycled to the steam pyrolytic cracker 702 via the alkane feed in line 701.

Returning to the de-propanizer 425, the $C_3$ and lighter hydrocarbons exiting via line 727 can be compressed using the one or more compressors 430. Compressing the $C_3$ and lighter hydrocarbons can facilitate the separation of lighter hydrocarbons from the heavier hydrocarbons via line 727. The compressed $C_3$ and lighter hydrocarbons exiting the one or more compressors 430 via line 732 can have a pressure of about 500 kPa to about 3,500 kPa. The compressed $C_3$ and lighter hydrocarbons can exit the one or more compressors 430 at a pressure of about 500 kPa to about 1,500 kPa. The compressed $C_3$ and lighter hydrocarbons can exit the one or more compressors 430 at a temperature of about 5° C. to about 100° C.

The compressed $C_3$ and lighter hydrocarbons via line 732 can be chilled using the one or more chill trains 435 to provide chilled $C_3$ and lighter hydrocarbons via line 737. The chilled $C_3$ and lighter hydrocarbons can exit the one or more chill trains 435 at a temperature of about −40° C. to about 40° C. The chilled $C_3$ and lighter hydrocarbons can have a temperature from about −20° C. to about 5° C.

The chilled $C_3$ and lighter hydrocarbons via line 737 can be introduced to the one or more de-methanizers 440 and separated therein to provide an overhead containing methane via line 742 and a bottoms containing $C_2$ and $C_3$ hydrocarbons via line 744. The de-methanizer overhead in line 742 can include from about 50 wt % to about 95 wt % methane or from about 70 wt %, about 80 wt %, or about 90 wt % methane. The pressure of the overhead in line 742 can range from about 300 kPa to about 1,000 kPa. The de-methanizer bottoms in line 744 can include from about 20 wt % to about 50 wt % $C_2$, and from about 40 wt % to about 80 wt % $C_3$.

The methane exiting the de-methanizer 440 can be compressed using the one or more compressors 445 to provide a compressed methane via line 747 which can be recycled to the FCC system 300 via line 330, as shown or recycled directly to FCC system 300 (not shown). Although not shown, the methane via line 742 can be directly recycled to the FCC system 300 via line 330. In one or more embodiments, about 15 vol % to about 35 vol %; about 20 vol % to about 35 vol %; about 25 vol % to about 35 vol %; or about 30 vol % to 35 vol % of the methane via line 742 can be recycled to the FCC system 300. The compressed methane via line 747 can be at a pressure of about 100 kPa to about 1,000 kPa, and a temperature of about 25° C. to about 200° C. In one or more embodiments, at least a portion of the methane in line 742 can be removed via line 742 as a final product.

The $C_2$ and $C_3$ hydrocarbons via line 744 can be introduced to the one or more de-ethanizers 450 and separated therein to provide an overhead containing a $C_2$ hydrocarbon mixture via line 752 and a bottoms containing a $C_3$ hydrocarbon mixture via line 754. The overhead in line 752 can include about 90 wt %, about 95 wt %, or about 99 wt % $C_2$. The overhead in line 752 can include from about 5 wt % to about 70 wt % ethane and from about 30 wt % to about 95 wt % ethylene. The bottoms in line 754 can include about 90 wt %, about 95 wt %, or about 99 wt % $C_3$. The bottoms in line 754 can include from about 5 wt % to about 30 wt % propane and from about 70 wt % to about 95 wt % propylene.

The $C_2$ hydrocarbon mixture via line 752 can be introduced to the one more C2 splitters 455 and separated therein to provide an overhead ("ethylene product") via line 457 and a bottoms ("ethane product") via line 459. The ethylene product in line 457 can include about 90 wt %, about 95 wt %, or about 99 wt % ethylene. The ethylene product in line 457 can include about 95 wt %, about 99 wt %, or about 99.9 wt % ethylene. The ethane product in line 459 can include about 90 wt %, about 95 wt %, or about 99 wt % ethane. The ethane product in line 459 can include about 95 wt %, about 99 wt %, or about 99.9 wt % ethane.

The $C_3$ hydrocarbon mixture via line 754 can be introduced to one or more C3 splitters 460 and separated therein to provide an overhead ("propylene product" or "second product") via line 462 and a bottoms ("propane product") via line 464. The propane product in line 464 can include about 90 wt %, about 95 wt %, or about 99 wt % propane. The propylene product in line 462 can include about 80 wt %, about 90 wt %, or about 95 wt % propylene.

All or any portion of the propylene product via line 462 can be recycled via line 763 to the hydrocarbon feedstock in line 330 and/or directly to the FCC system 300 (not shown). Recycling at least a portion of the propylene to the FCC system 300 via the hydrocarbon feedstock in line 330 or directly can suppress propylene production in the FCC system 300, thereby preferentially increasing the ethylene yield. In one or more embodiments, about 10 vol % to about 60 vol %; about 20 vol % to about 60 vol %; about 30 vol % to about 60 vol %; about 40 vol % to about 60 vol %; or about 50 vol % to about 60 vol % of the propylene product in line 462 can be recycled via line 763 to the hydrocarbon feedstock in line 330 and/or FCC system 300. In one or more embodiments, about 60 vol % to about 100 vol %; about 70 vol % to about 100 vol %; about 80 vol % to about 100 vol %; or about 90 vol % to about 100 vol % of the propylene product in line 462 can be recycled via line 763 to the hydrocarbon feedstock in line 330 and/or FCC system 300.

In one or more embodiments, all or any portion of the ethane product via line 459 can be recycled to the one or more steam pyrolytic crackers 702 via the alkane feed in line 701. In one or more embodiments, all or any portion of the propane product via line 464 can be recycled to the one or more steam pyrolytic crackers 702 via the alkane feed in line 701. For example, about 60 vol % to about 100 vol %, about 70 vol % to about 100 vol %, about 80 vol % to about 100 vol %, or about 90 vol % to about 100 vol % of the ethane product via line 459 and about 70 vol % to about 100 vol %, about 80 vol % to about 100 vol %, or about 90 vol % to about 100 vol % of the propane product via line 464 can be recycled to the one or more steam pyrolytic crackers 702, either directly (not shown) or via the alkane feed in line 701. In one or more embodiments, about 15 vol % to about 55 vol %, about 25 vol % to about 55 vol %, about 35 vol % to about 55 vol %, or about 45 vol % to about 55 vol % of the propane product via line 464 can be recycled to the one or more steam pyrolytic crackers 702. In one or more embodiments, about 15 vol % to about 45 vol %, about 25 vol % to about 45 vol %, or about 35 vol % to about 45 vol % of the ethane product via line 459 can be recycled to the one or more steam pyrolytic crackers 702. In one or more embodiments, at least a portion of the ethane product in line 459 can be removed as a finished product (not shown).

The embodiments discussed and described in FIGS. 2-6 can include the surge drum system 100, discussed and described above with reference to FIG. 1, operating as part of various FCC processes where the slurry is returned to a regenerator. Embodiments of the surge drum system 100 can be used with a conventional FCC process where the slurry would be returned directly to a riser. Conventional FCC processes are discussed and described in U.S. Pat. Nos. 7,713,491; 7,484,773; 7,611,622; and U.S. Patent Application Publication No. 2006/0049082.

Embodiments of surge drum system 100 can also be used with other systems including, but not limited to, conventional FCC systems, coal and/or petroleum coke feed slurry systems, asphaltene feed slurry systems, syngas systems, hydrated lime storage, and hydrocracking/hydrogenation systems. Embodiments of surge drum system 100 can be used with systems where the liquid portion of the slurry can include, but is not limited to, aqueous rich liquid, raw water, process condensate, treated water, hydrocarbon liquids, or any combination thereof. Embodiments of surge drum system 100 can also be used with systems where the particulate portion of the slurry can include, but is not limited to, coal particulates, coal fines, petroleum coke particulates, coal ash particulates, asphaltene particulates, catalyst fines, or combinations thereof.

Prophetic Examples

Embodiments discussed and described herein can be further described with the following prophetic examples. Although the simulated examples are directed to specific embodiments, they are not to be viewed as limiting in any specific respect.

Figure 8:
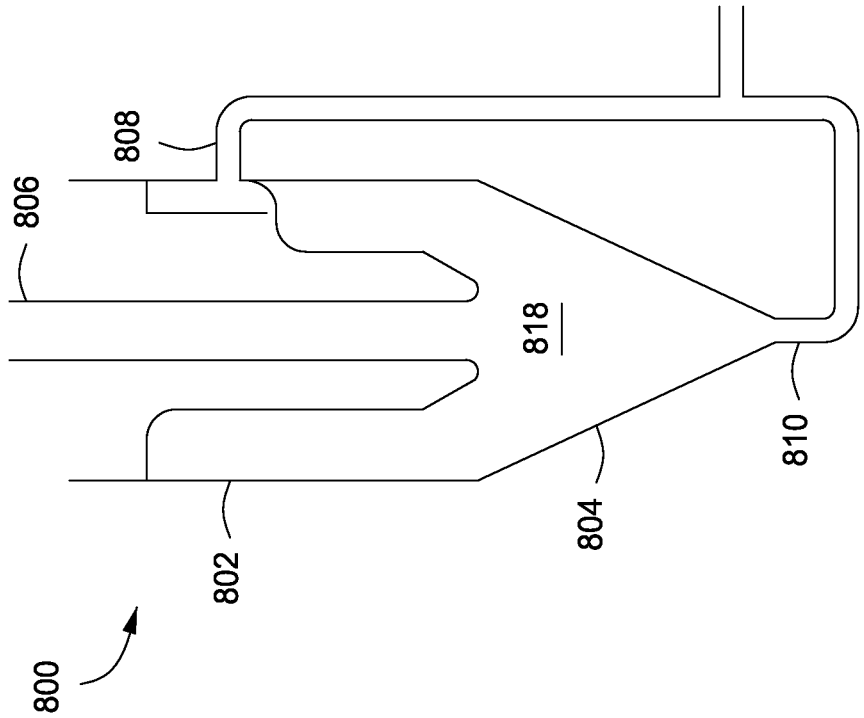
FIG. 8 depicts the simulated contours of volume fraction of an elevational, cross-sectional view of an illustrative storage tank with a recirculation flow, according to one or more embodiments described.
Figure 7:
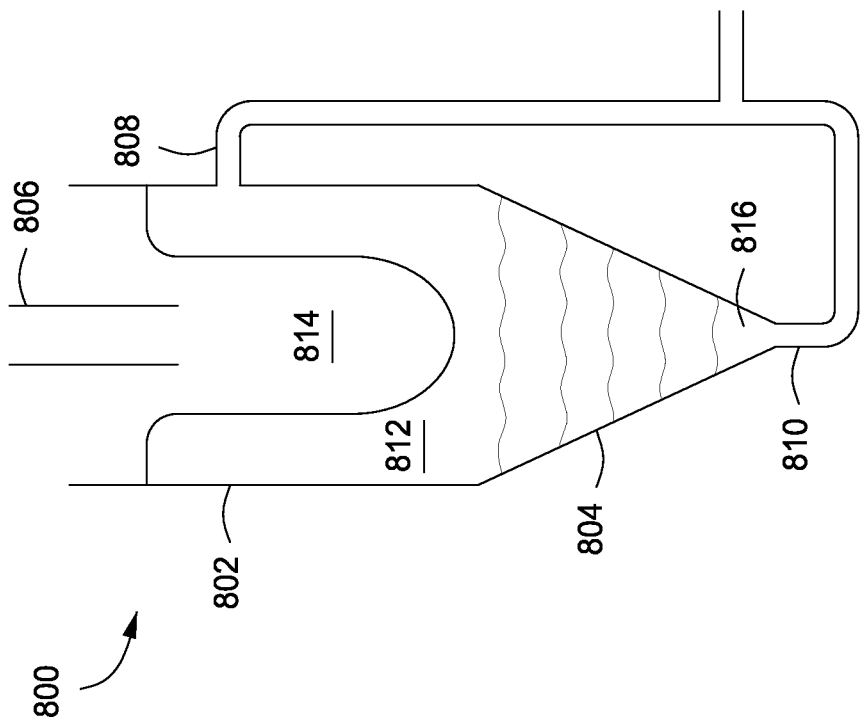
FIG. 7 depicts the simulated contours of volume fraction of an elevational, cross-sectional view of an illustrative storage tank without a recirculation flow, according to one or more embodiments described.

FIGS. 7 and 8 are derived from computational fluid dynamics ("CFD") simulations that are widely used to simulate gas and/or liquid flow fields, and were used to model the concentration of solid particles within slurry contained within a storage vessel having a conical lower end. The summary of the CFD results is shown in FIGS. 7 and 8.

FIGS. 7 and 8 depict slurry flowing into a storage vessel 800 having a substantially cylindrical wall 802 and a conical bottom end 804. Slurry flows into the storage vessel 800 through an inlet 806. An outlet 808 is located on the cylindrical wall 802 and a recirculation inlet 810 is located on the conical bottom end 804. To generate the results depicted in FIGS. 7 and 8, the liquid viscosity is set to 2.1 cP, the solid particles within the slurry have a diameter of 50 microns, the volume fraction of particles in the slurry is set at 0.02, and the inlet flow rate is set to 0.3 m/s (10.47 kg/sec). FIGS. 7 and 8 depict the contours of volume fraction of particles within the slurry after an elapsed time of approximately 700 seconds.

In FIG. 7, the flow rate through recirculation inlet 810 is set to 0 m/s. Without any flow through circulation inlet 810, the solid particles tend to settle toward the conical bottom end 804. The volume fraction of particles in a volume 812 near the cylindrical wall 802 is about 0.0225 and about 0.02 in a volume 814 near the center of the storage vessel 800. The volume fraction of particles gradually increases toward the conical bottom end 804 to a maximum of about 0.04 in a volume 816 near the circulation inlet 810.

In FIG. 8, the flow rate through recirculation inlet 810 is set to 5 m/s. With flow through the recirculation inlet 810 a substantial volume 818 within the storage vessel 800 has a volume fraction of solid particles of about 0.02. The flow through recirculation inlet 810 eliminates the tendency of particles to settle within the conical bottom end 804 and serves to maintain the distribution of the solid particles within the storage vessel 800.

Embodiments discussed and described herein further relate to any one or more of the following paragraphs 1 through 20:

1. A surge drum system for storing a slurry, comprising a storage vessel having a first end, a second end, and at least one wall surrounding an internal volume between the first and second ends; a slurry inlet in fluid communication with the internal volume; an outlet in fluid communication with the internal volume; a recirculation inlet in fluid communication with the internal volume at the first end of the storage vessel; a pump having a suction line in fluid communication with the outlet; and a recirculation valve in fluid communication with a discharge line of the pump and the recirculation inlet; an outlet valve in fluid communication with the discharge line of the pump.

2. The system according to paragraph 1, further comprising a deflector disposed within the internal volume so as to impede direct flow between the slurry inlet and the recirculation inlet.

3. The system according to paragraphs 1 or 2, wherein the first end is sloped toward the recirculation inlet.

4. The system according any of paragraphs 1 to 3, wherein at least a portion of the first end is conical.

5. The system according to any of paragraphs 1 to 4, wherein the outlet valve is in fluid communication with a catalyst regenerator.

6. The system according to any of paragraphs 1 to 5, wherein the slurry inlet is in fluid communication with a filtration system.

7. The system according to any of paragraphs 1 to 6, wherein the outlet is disposed on the storage vessel intermediate the first end and the slurry inlet.

8. A method for storing a slurry, comprising: introducing a slurry into a slurry inlet of a storage vessel having a first end and at least one wall; operating a pump to remove a portion of the slurry from the storage vessel through an outlet; introducing a first portion of the removed slurry into a recirculation inlet disposed in fluid communication with the first end of the storage vessel; and introducing a second portion of the removed slurry to an outlet valve in fluid communication with the pump.

9. The method according to paragraph 8, wherein the storage vessel has a flow deflector that impedes direct flow between the slurry inlet and the recirculation inlet.

10. The method according to paragraph 8 or 9, wherein the first end is sloped toward the recirculation inlet.

11. The method according to any of paragraphs 8 to 10, wherein the outlet is disposed intermediate the first end and the slurry inlet.

12. The method according to any of paragraphs 9 to 11, further comprising introducing the second portion of the removed slurry into a catalyst regenerator; and combusting the second portion of the removed slurry to generate heat that is used to regenerate a catalyst.

13. The method according to any of paragraphs 9 to 12, further comprising introducing the regenerated catalyst into a riser containing a hydrocarbon; and cracking the hydrocarbon in the presence of the regenerated catalyst to form an effluent product.

14. The method according to any of paragraphs 9 to 13, further comprising introducing the effluent product into a quench tower containing a quench oil; and contacting the effluent product with the quench oil to produce a cooled product gas.

15. The method according to any of paragraphs 9 to 14, further comprising circulating the quench oil through a filtration system to produce a slurry; and introducing the slurry to the slurry inlet.

16. A fluid catalytic cracking system comprising a fluid catalytic cracking riser operable to react a hydrocarbon with a catalyst to produce a product; a quench tower in fluid communication with the fluid catalytic cracking riser and operable to mix the product with a quench oil; a filtration system in fluid communication with the quench tower and operable to remove a fuel oil slurry from the quench oil; a surge drum system in fluid communication with the filtration system, wherein the surge drum system comprises a storage vessel having a first end and at least one wall surrounding an internal volume; a slurry inlet in fluid communication with the internal volume; an outlet in fluid communication with the internal volume; a recirculation inlet in fluid communication with the internal volume at the first end of the storage vessel; a pump having a suction line in fluid communication with the outlet; a recirculation valve in fluid communication with a discharge line of the pump and the recirculation inlet; an outlet valve in fluid communication with the discharge line of the pump; and a regenerator in fluid communication with the outlet valve and operable to supply catalyst to the fluid catalytic cracking riser.

17. The system according to paragraph 16, wherein the surge drum system further comprises a deflector disposed within the internal volume so as to impede direct flow between the slurry inlet and the recirculation inlet.

18. The system according to paragraph 16 or 17, wherein the first end of the storage vessel is sloped toward the recirculation inlet.

19. The system according to any of paragraphs 16 to 18, wherein at least a portion of the first end of the storage vessel is conical.

20. The system according to any of paragraphs 16 to 19, wherein the outlet is disposed intermediate the first end and the slurry inlet.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A surge drum system for storing a slurry, comprising:
   a storage vessel having a sloped first end, a second end, and at least one wall surrounding an internal volume between the first and second ends;
   a slurry inlet in fluid communication with the internal volume and located proximate the second end of the storage vessel, the slurry inlet configured to direct the slurry entering the storage vessel toward the first end;
   a recirculation inlet in fluid communication with the internal volume and located proximate the first end of the storage vessel, the recirculation inlet configured to direct the slurry toward the second end;
   an outlet in fluid communication with the internal volume, the outlet located between the slurry inlet and the recirculation inlet and proximate an upper surface of the slurry in the internal volume;
   a pump having a suction line in fluid communication with the outlet;
   a recirculation valve in fluid communication with a discharge line of the pump and the recirculation inlet; and
   an outlet valve in fluid communication with the discharge line of the pump.

2. The system of claim 1, further comprising a deflector disposed within the internal volume and between the slurry inlet and the upper surface of the slurry in the internal volume, the deflector having a surface redirecting flow between the slurry inlet and the recirculation inlet.

3. The system of claim 1, wherein the outlet valve is in fluid communication with a catalyst regenerator.

4. The system of claim 1, wherein the slurry inlet is in fluid communication with a filtration system.

5. The system of claim 2, wherein the recirculation inlet is configured to direct the slurry toward a first side of the deflector, wherein the slurry inlet is configured to direct the slurry toward a second side of the deflector, and wherein the slurry contacts the deflector before collecting in the storage vessel.

6. The system of claim 1, wherein the first end is sloped to concentrate particles and wherein the recirculation inlet directs the fuel oil slurry into particles concentrated in the first end.

7. The system of claim 6, further comprising an outlet valve in communication with the discharge line, the recirculation valve and the outlet valve cooperating to flow a portion of the fuel oil slurry from the pump to the recirculation inlet.

8. A method for storing a slurry, comprising:
   introducing a slurry into a slurry inlet of a storage vessel, wherein:
      the storage vessel has a sloped first end, a second end, and at least one wall surrounding an internal volume between the first and second ends, and
      the slurry inlet is in fluid communication with the internal volume and located proximate the second end of the storage vessel, the slurry inlet being configured to direct the slurry entering the storage vessel toward the first end;
   operating a pump to remove a portion of the slurry from the storage vessel through a suction line in fluid communication with an outlet that is in fluid communication with the internal volume, wherein the outlet is located between the slurry inlet and a recirculation inlet and proximate an upper surface of the slurry in the internal volume;
   conveying a first portion of the removed slurry through a recirculation valve in fluid communication with a discharge line of the pump and the recirculation inlet;
   introducing the first portion of the removed slurry into the recirculation inlet, the recirculation inlet being in fluid communication with the internal volume and located proximate the first end of the storage vessel, the recirculation inlet configured to direct the slurry toward the second end; and
   introducing a second portion of the removed slurry to an outlet valve in fluid communication with the discharge line of the pump.

9. The method of claim 8, wherein the storage vessel has a flow deflector that impedes direct flow between the slurry inlet and the recirculation inlet.

10. The method of claim 8, further comprising:
   introducing the second portion of the removed slurry into a catalyst regenerator; and
   combusting the second portion of the removed slurry to generate heat that is used to regenerate a catalyst.

11. The method of claim 10, further comprising:
   introducing the generated catalyst into a riser containing a hydrocarbon; and
   cracking the hydrocarbon in the presence of the regenerated catalyst to form an effluent product.

12. The method of claim 11, further comprising:
   introducing the effluent product into a quench tower containing a quench oil; and
   contacting the effluent product with the quench oil to produce a cooled product gas.

13. The method of claim 12, further comprising:
   circulating the quench oil through a filtration system to produce a slurry; and
   introducing the slurry to the slurry inlet.

14. A fluid catalytic cracking system comprising:
   a fluid catalytic cracking riser operable to react a hydrocarbon with a catalyst to produce a product;
   a quench tower in fluid communication with the fluid catalyst cracking riser and operable to mix the product with a quench oil;

a filtration system in fluid communication with the quench tower and operable to remove a fuel oil slurry from the quench oil;

a surge drum system in fluid communication with filtration system, wherein the surge drum system comprises:
  a storage vessel having a first end, a second end, and at least one wall surrounding an internal volume and located proximate the second end of the storage vessel;
  a slurry inlet in fluid communication with the internal volume and located proximate the second end of the storage vessel, the slurry inlet receiving the fuel oil slurry from the filtration system and directing the fuel oil slurry entering the storage vessel toward the first end;
  a recirculation inlet in fluid communication with the internal volume and located proximate the first end of the storage vessel, the recirculation inlet configured to direct the fuel oil slurry toward the second end;
  an outlet in fluid communication with the internal volume, the outlet located between the slurry inlet and the recirculation inlet;
  a pump having a suction line in fluid communication with outlet;
  a recirculation valve in fluid communication with a discharge line of the pump and the recirculation inlet;
  an outlet valve in fluid communication with discharge line of the pump; and
  a regenerator in fluid communication with the outlet valve and operable to supply catalyst to the fluid catalytic cracking riser, wherein the surge drum system further comprises a deflector disposed within the internal volume so as to impede direct flow between the slurry inlet and the recirculation inlet, wherein the deflector is position above an upper surface of the slurry in the internal volume.

15. The system of claim 14, further comprising:
a recirculation line conveying the fuel oil slurry from the recirculation valve to the recirculation inlet; and
an outlet valve in fluid communication with the discharge line, the recirculation valve and the outlet valve cooperating to flow a portion of the fuel oil slurry to the recirculation inlet.

16. The system of claim 14, wherein the recirculation inlet is positioned at a low point of the storage vessel and is configured to direct the fuel oil slurry into concentrated particles in the storage vessel.

17. The system of claim 14, wherein the slurry inlet directs the fuel oil slurry flow downward to the first end and the recirculation inlet directs the fuel oil slurry flow upward to the second end.

* * * * *